(12) United States Patent
Pilz

(10) Patent No.: US 10,954,670 B2
(45) Date of Patent: *Mar. 23, 2021

(54) MULTI-LAYER FIRE-RATED JOINT COMPONENT

(71) Applicant: CALIFORNIA EXPANDED METAL PRODUCTS COMPANY, City of Industry, CA (US)

(72) Inventor: Donald Anthony Pilz, Livermore, CA (US)

(73) Assignee: California Expanded Metal Products Company, City of Industry, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/871,644

(22) Filed: May 11, 2020

(65) Prior Publication Data

US 2020/0340242 A1 Oct. 29, 2020

Related U.S. Application Data

(63) Continuation of application No. 16/103,693, filed on Aug. 14, 2018, now Pat. No. 10,689,842.

(Continued)

(51) Int. Cl.
  *E04B 1/94* (2006.01)
  *E04B 2/74* (2006.01)
  (Continued)

(52) U.S. Cl.
  CPC .............. *E04B 1/948* (2013.01); *A62C 2/065* (2013.01); *B29K 2995/0016* (2013.01);
  (Continued)

(58) Field of Classification Search
  CPC ........ E04B 1/943; E04B 1/948; E04B 2/7411; E04B 2/7457; E04B 2002/7481;
  (Continued)

(56) References Cited

U.S. PATENT DOCUMENTS 1,130,722 A 3/1915 Fletcher
1,563,651 A 12/1925 Pomerantz
(Continued)

FOREIGN PATENT DOCUMENTS

CA 2234347 10/1999
CA 2698295 12/2013
(Continued)

OTHER PUBLICATIONS

U.S. Appl. No. 15/469,370, filed Mar. 24, 2017, Pilz et al.
(Continued)

*Primary Examiner* — James M Ference
(74) *Attorney, Agent, or Firm* — Knobbe, Martens, Olson & Bear, LLP

(57) ABSTRACT

An improved fire-blocking gasket profile for a fire-rated joint, such as a head-of-wall assembly. Fire-rated joints are aimed at inhibiting or preventing fire, heat, or smoke from leaving one portion of a building and entering another portion of a building. Fire-rated joints can also accommodate movement between adjacent building structures, such as between a ceiling and the top of a wall. The improved fire-blocking gasket profile includes a first layer formed of an intumescent material, a second layer formed of a foil lining and a third layer formed of the vinyl profile. The vinyl profile includes an air gap with the intumescent material positioned therein. A vertical portion of the vinyl profile is positioned between a header track and a wallboard in the fire-rated joint. A horizontal portion of the vinyl profile is positioned at least partially within a deflection gap and sealingly engages with the ceiling.

17 Claims, 9 Drawing Sheets

Related U.S. Application Data

(60) Provisional application No. 62/688,945, filed on Jun. 22, 2018, provisional application No. 62/643,325, filed on Mar. 15, 2018.

(51) Int. Cl.
  *A62C 2/06* (2006.01)
  *B32B 27/30* (2006.01)

(52) U.S. Cl.
  CPC ............ *B32B 27/30* (2013.01); *B32B 2419/00* (2013.01); *E04B 1/943* (2013.01); *E04B 2/7411* (2013.01); *E04B 2/7457* (2013.01); *E04B 2002/7481* (2013.01)

(58) Field of Classification Search
  CPC ............ A62C 2/065; B29K 2995/0016; B32B 2419/00; B32B 27/30
  See application file for complete search history.

(56) References Cited

U.S. PATENT DOCUMENTS

| | | | |
|---|---|---|---|
| 2,105,771 | A | 1/1938 | Holdsworth |
| 2,218,426 | A | 10/1940 | Hulbert, Jr. |
| 2,556,878 | A | 6/1951 | Kohlhaas |
| 2,664,739 | A | 1/1954 | Marcy |
| 2,683,927 | A | 7/1954 | Maronek |
| 2,733,786 | A | 2/1956 | Drake |
| 3,129,792 | A | 4/1964 | Gwynne |
| 3,271,920 | A | 9/1966 | Downing, Jr. |
| 3,309,826 | A | 3/1967 | Zinn |
| 3,324,615 | A | 6/1967 | Zinn |
| 3,355,852 | A | 12/1967 | Lally |
| 3,397,495 | A | 8/1968 | Thompson |
| 3,481,090 | A | 12/1969 | Lizee |
| 3,537,219 | A | 11/1970 | Navarre |
| 3,562,985 | A | 2/1971 | Nicosia |
| 3,566,559 | A | 3/1971 | Dickson |
| 3,648,419 | A | 3/1972 | Marks |
| 3,668,041 | A | 6/1972 | Lonning |
| 3,707,819 | A | 1/1973 | Calhoun et al. |
| 3,730,477 | A | 5/1973 | Wavrunek |
| 3,744,199 | A | 7/1973 | Navarre |
| 3,757,480 | A | 9/1973 | Young |
| 3,786,604 | A | 1/1974 | Kramer |
| 3,837,126 | A | 9/1974 | Voiturier et al. |
| 3,839,839 | A | 10/1974 | Tillisch et al. |
| 3,908,328 | A | 9/1975 | Nelsson |
| 3,921,346 | A | 11/1975 | Sauer et al. |
| 3,922,830 | A | 12/1975 | Guarino et al. |
| 3,934,066 | A | 1/1976 | Murch |
| 3,935,681 | A | 2/1976 | Voiturier et al. |
| 3,955,330 | A | 5/1976 | Wendt |
| 3,964,214 | A | 6/1976 | Wendt |
| 3,974,607 | A | 8/1976 | Balinski |
| 3,976,825 | A | 8/1976 | Anderberg |
| 4,011,704 | A | 3/1977 | O'Konski |
| 4,103,463 | A | 8/1978 | Dixon |
| 4,122,203 | A | 10/1978 | Stahl |
| 4,130,972 | A | 12/1978 | Varlonga |
| 4,139,664 | A | 2/1979 | Wenrick |
| 4,144,335 | A | 3/1979 | Edwards |
| 4,144,385 | A | 3/1979 | Downing |
| 4,152,878 | A | 5/1979 | Balinski |
| 4,164,107 | A | 8/1979 | Kraemling et al. |
| 4,178,728 | A | 12/1979 | Ortmanns et al. |
| 4,203,264 | A | 5/1980 | Kiefer et al. |
| 4,276,332 | A | 6/1981 | Castle |
| 4,283,892 | A | 8/1981 | Brown |
| 4,318,253 | A | 3/1982 | Wedel |
| 4,329,820 | A | 5/1982 | Wendt |
| 4,356,672 | A | 11/1982 | Beckman et al. |
| 4,361,994 | A | 12/1982 | Carver |
| 4,424,653 | A | 1/1984 | Heinen |
| 4,434,592 | A | 3/1984 | Reneault et al. |
| 4,437,274 | A | 3/1984 | Slocum et al. |
| 4,454,690 | A | 6/1984 | Dixon |
| 4,480,419 | A | 11/1984 | Crites |
| 4,495,238 | A | 1/1985 | Adiletta |
| 4,575,979 | A | 3/1986 | Mariani |
| 4,598,516 | A | 7/1986 | Groshong |
| 4,622,794 | A | 11/1986 | Geortner |
| 4,632,865 | A | 12/1986 | Tzur |
| 4,649,089 | A | 3/1987 | Thwaites |
| 4,672,785 | A | 6/1987 | Salvo |
| 4,709,517 | A | 12/1987 | Mitchell et al. |
| 4,711,183 | A | 12/1987 | Handler et al. |
| 4,723,385 | A | 2/1988 | Kallstrom |
| 4,756,945 | A | 7/1988 | Gibb |
| 4,761,927 | A | 8/1988 | O'Keeffe et al. |
| 4,787,767 | A | 11/1988 | Wendt |
| 4,805,364 | A | 2/1989 | Smolik |
| 4,822,659 | A | 4/1989 | Anderson et al. |
| 4,825,610 | A | 5/1989 | Gasteiger |
| 4,845,904 | A | 7/1989 | Menchetti |
| 4,850,385 | A | 7/1989 | Harbeke |
| 4,854,096 | A | 8/1989 | Smolik |
| 4,866,898 | A | 9/1989 | LaRoche et al. |
| 4,881,352 | A | 11/1989 | Glockenstein |
| 4,885,884 | A | 12/1989 | Schilger |
| 4,899,510 | A | 2/1990 | Propst |
| 4,914,880 | A | 4/1990 | Albertini |
| 4,918,761 | A | 4/1990 | Harbeke |
| 4,930,276 | A | 6/1990 | Bawa et al. |
| 4,935,281 | A | 6/1990 | Tolbert et al. |
| 5,010,702 | A | 4/1991 | Daw et al. |
| 5,090,170 | A | 2/1992 | Propst |
| 5,094,780 | A | 3/1992 | Von Bonin |
| 5,103,589 | A | 4/1992 | Crawford |
| 5,125,203 | A | 6/1992 | Daw |
| 5,127,203 | A | 7/1992 | Paquette |
| 5,127,760 | A | 7/1992 | Brady |
| 5,146,723 | A | 9/1992 | Greenwood et al. |
| 5,155,957 | A | 10/1992 | Robertson et al. |
| 5,157,883 | A | 10/1992 | Meyer |
| 5,167,876 | A | 12/1992 | Lem |
| 5,173,515 | A | 12/1992 | von Bonin et al. |
| 5,203,132 | A | 4/1993 | Smolik |
| 5,212,914 | A | 5/1993 | Martin et al. |
| 5,222,335 | A | 6/1993 | Petrecca |
| 5,244,709 | A | 9/1993 | Vanderstukken |
| 5,285,615 | A | 2/1994 | Gilmour |
| 5,315,804 | A | 5/1994 | Attalla |
| 5,325,651 | A | 7/1994 | Meyer et al. |
| 5,347,780 | A | 9/1994 | Richards et al. |
| 5,367,850 | A | 11/1994 | Nicholas |
| 5,374,036 | A | 12/1994 | Rogers et al. |
| 5,376,429 | A | 12/1994 | McGroarty |
| 5,390,458 | A | 2/1995 | Menchetti |
| 5,390,465 | A | 2/1995 | Rajecki |
| 5,394,665 | A | 3/1995 | Johnson |
| 5,412,919 | A | 5/1995 | Pellock et al. |
| 5,433,991 | A | 7/1995 | Boyd, Jr. et al. |
| 5,452,551 | A | 9/1995 | Charland et al. |
| 5,454,203 | A | 10/1995 | Turner |
| 5,456,050 | A | 10/1995 | Ward |
| 5,460,864 | A | 10/1995 | Heitkamp |
| 5,471,791 | A | 12/1995 | Keller |
| 5,471,805 | A | 12/1995 | Becker |
| 5,477,652 | A | 12/1995 | Torrey et al. |
| 5,502,937 | A | 4/1996 | Wilson |
| 5,552,185 | A | 9/1996 | De Keyser |
| 5,592,796 | A | 1/1997 | Landers |
| 5,604,024 | A | 2/1997 | von Bonin |
| 5,644,877 | A | 7/1997 | Wood |
| 5,687,538 | A | 11/1997 | Frobosilo et al. |
| 5,689,922 | A | 11/1997 | Daudet |
| 5,709,821 | A | 1/1998 | von Bonin et al. |
| 5,724,784 | A | 3/1998 | Menchetti |
| 5,735,100 | A | 4/1998 | Campbell |
| 5,740,635 | A | 4/1998 | Gil et al. |
| 5,740,643 | A | 4/1998 | Huntley |
| 5,755,066 | A | 5/1998 | Becker |

(56) References Cited

U.S. PATENT DOCUMENTS

| | | | |
|---|---|---|---|
| 5,765,332 | A | 6/1998 | Landin et al. |
| 5,787,651 | A | 8/1998 | Horn et al. |
| 5,797,233 | A | 8/1998 | Hascall |
| 5,806,261 | A | 9/1998 | Huebner et al. |
| 5,822,935 | A | 10/1998 | Mitchell et al. |
| 5,870,866 | A | 2/1999 | Herndon |
| 5,913,788 | A | 6/1999 | Herren |
| 5,921,041 | A | 7/1999 | Egri, II |
| 5,927,041 | A | 7/1999 | Sedlmeier et al. |
| 5,930,963 | A | 8/1999 | Nichols |
| 5,930,968 | A | 8/1999 | Pullman |
| 5,945,182 | A | 8/1999 | Fowler et al. |
| 5,950,385 | A | 9/1999 | Herren |
| 5,968,615 | A | 10/1999 | Schlappa |
| 5,968,669 | A | 10/1999 | Liu et al. |
| 5,970,672 | A | 10/1999 | Robinson |
| 5,974,750 | A | 11/1999 | Landin et al. |
| 5,974,753 | A | 11/1999 | Hsu |
| 6,023,898 | A | 2/2000 | Josey |
| 6,058,668 | A | 5/2000 | Herren |
| 6,061,985 | A | 5/2000 | Kraus et al. |
| 6,110,559 | A | 8/2000 | De Keyser |
| 6,116,404 | A | 9/2000 | Heuft et al. |
| 6,119,411 | A | 9/2000 | Mateu Gil et al. |
| 6,128,874 | A | 10/2000 | Olson et al. |
| 6,131,352 | A | 10/2000 | Barnes et al. |
| 6,151,858 | A | 11/2000 | Ruiz et al. |
| 6,153,668 | A | 11/2000 | Gestner et al. |
| 6,176,053 | B1 | 1/2001 | St. Germain |
| 6,182,407 | B1 | 2/2001 | Turpin et al. |
| 6,189,277 | B1 | 2/2001 | Boscamp |
| 6,207,077 | B1 | 3/2001 | Burnell-Jones |
| 6,207,085 | B1 | 3/2001 | Ackerman |
| 6,213,679 | B1 | 4/2001 | Frobosilo et al. |
| 6,216,404 | B1 | 4/2001 | Vellrath |
| 6,233,888 | B1 | 5/2001 | Wu |
| 6,256,948 | B1 | 7/2001 | Van Dreumel |
| 6,256,960 | B1 | 7/2001 | Babcock et al. |
| 6,279,289 | B1 | 8/2001 | Soder et al. |
| 6,305,133 | B1 | 10/2001 | Cornwall |
| 6,318,044 | B1 | 11/2001 | Campbell |
| 6,374,558 | B1 | 4/2002 | Surowiecki |
| 6,381,913 | B2 | 5/2002 | Herren |
| 6,405,502 | B1 | 6/2002 | Cornwall |
| 6,430,881 | B1 | 8/2002 | Daudet et al. |
| 6,470,638 | B1 | 10/2002 | Larson |
| 6,595,383 | B2 | 7/2003 | Pietrantoni |
| 6,606,831 | B2 | 8/2003 | Degelsegger |
| 6,647,691 | B2 | 11/2003 | Becker et al. |
| 6,668,499 | B2 | 12/2003 | Degelsegger |
| 6,679,015 | B1 | 1/2004 | Cornwall |
| 6,698,146 | B2 | 3/2004 | Morgan et al. |
| 6,705,047 | B2 | 3/2004 | Yulkowski |
| 6,711,871 | B2 | 3/2004 | Beirise et al. |
| 6,732,481 | B2 | 5/2004 | Stahl, Sr. |
| 6,739,926 | B2 | 5/2004 | Riach et al. |
| 6,748,705 | B2 | 6/2004 | Orszulak |
| 6,783,345 | B2 | 8/2004 | Morgan et al. |
| 6,799,404 | B2 | 10/2004 | Spransy |
| 6,843,035 | B1 | 1/2005 | Glynn |
| 6,854,237 | B2 | 2/2005 | Surowiecki |
| 6,871,470 | B1 | 3/2005 | Stover |
| 6,951,162 | B1 | 10/2005 | Shockey et al. |
| 7,043,880 | B2 | 5/2006 | Morgan et al. |
| 7,059,092 | B2 | 6/2006 | Harkins et al. |
| 7,104,024 | B1 | 9/2006 | deGirolamo et al. |
| 7,152,385 | B2 | 12/2006 | Morgan et al. |
| 7,191,845 | B2 | 3/2007 | Loar |
| 7,240,905 | B1 | 7/2007 | Stahl |
| 7,251,918 | B2 | 8/2007 | Reif et al. |
| 7,302,776 | B2 | 12/2007 | Duncan et al. |
| 7,398,856 | B2 | 7/2008 | Foster et al. |
| 7,413,024 | B1 | 8/2008 | Simontacchi et al. |
| 7,487,591 | B2 | 2/2009 | Harkins et al. |
| 7,506,478 | B2 | 3/2009 | Bobenhausen |
| 7,513,082 | B2 | 4/2009 | Johnson |
| 7,540,118 | B2 | 6/2009 | Jensen |
| 7,594,331 | B2 | 9/2009 | Andrews et al. |
| 7,603,823 | B2 | 10/2009 | Cann |
| 7,610,725 | B2 | 11/2009 | Willert |
| 7,617,643 | B2 | 11/2009 | Pilz et al. |
| 7,681,365 | B2 | 3/2010 | Klein |
| 7,685,792 | B2 | 3/2010 | Stahl, Sr. et al. |
| 7,716,891 | B2 | 5/2010 | Radford |
| 7,752,817 | B2 | 7/2010 | Pilz et al. |
| 7,775,006 | B2 | 8/2010 | Giannos |
| 7,776,170 | B2 | 8/2010 | Yu et al. |
| 7,797,893 | B2 | 9/2010 | Stahl, Sr. et al. |
| 7,810,295 | B2 | 10/2010 | Thompson |
| 7,814,718 | B2 | 10/2010 | Klein |
| 7,827,738 | B2 | 11/2010 | Abrams et al. |
| 7,866,108 | B2 | 1/2011 | Klein |
| 7,870,698 | B2 | 1/2011 | Tonyan et al. |
| 7,921,614 | B2 | 4/2011 | Fortin et al. |
| 7,941,981 | B2 | 5/2011 | Shaw |
| 7,950,198 | B2 | 5/2011 | Pilz et al. |
| 7,984,592 | B1 | 7/2011 | Jiras |
| 8,056,293 | B2 | 11/2011 | Klein |
| 8,061,099 | B2 | 11/2011 | Andrews |
| 8,062,108 | B2 | 11/2011 | Carlson et al. |
| 8,069,625 | B2 | 12/2011 | Harkins et al. |
| 8,074,412 | B1 | 12/2011 | Gogan et al. |
| 8,074,416 | B2 | 12/2011 | Andrews |
| 8,087,205 | B2 | 1/2012 | Pilz et al. |
| 8,100,164 | B2 | 1/2012 | Goodman et al. |
| 8,132,376 | B2 | 3/2012 | Pilz et al. |
| 8,136,314 | B2 | 3/2012 | Klein |
| 8,151,526 | B2 | 4/2012 | Klein |
| 8,181,404 | B2 | 5/2012 | Klein |
| 8,225,581 | B2 | 7/2012 | Strickland et al. |
| 8,281,552 | B2 | 10/2012 | Pilz et al. |
| 8,322,094 | B2 | 12/2012 | Pilz et al. |
| 8,353,139 | B2 * | 1/2013 | Pilz ............... E04B 2/7411 52/232 |
| 8,375,666 | B2 | 2/2013 | Stahl, Jr. et al. |
| 8,413,394 | B2 * | 4/2013 | Pilz ............... E04B 2/7411 52/207 |
| 8,495,844 | B1 | 7/2013 | Johnson |
| 8,499,512 | B2 * | 8/2013 | Pilz ............... E04B 1/24 52/235 |
| 8,555,566 | B2 * | 10/2013 | Pilz ............... E04B 2/828 52/167.1 |
| 8,578,672 | B2 | 11/2013 | Mattox et al. |
| 8,584,415 | B2 | 11/2013 | Stahl, Jr. et al. |
| 8,590,231 | B2 * | 11/2013 | Pilz ............... E04B 2/7411 52/232 |
| 8,595,999 | B1 * | 12/2013 | Pilz ............... E04B 2/7411 52/232 |
| 8,596,019 | B2 | 12/2013 | Aitken |
| 8,607,519 | B2 | 12/2013 | Hilburn |
| 8,640,415 | B2 | 2/2014 | Pilz et al. |
| 8,646,235 | B2 | 2/2014 | Hilburn, Jr. |
| 8,671,632 | B2 | 3/2014 | Pilz et al. |
| 8,728,608 | B2 | 5/2014 | Maisch |
| 8,793,947 | B2 | 8/2014 | Pilz et al. |
| 8,938,922 | B2 | 1/2015 | Pilz et al. |
| 8,973,319 | B2 | 3/2015 | Pilz et al. |
| 9,045,899 | B2 * | 6/2015 | Pilz ............... E04B 1/947 |
| 9,127,454 | B2 | 9/2015 | Pilz et al. |
| 9,151,042 | B2 | 10/2015 | Simon et al. |
| 9,206,596 | B1 | 12/2015 | Robinson |
| 9,290,932 | B2 | 3/2016 | Pilz et al. |
| 9,290,934 | B2 | 3/2016 | Pilz et al. |
| 9,371,644 | B2 | 6/2016 | Pilz et al. |
| 9,458,628 | B2 | 10/2016 | Pilz et al. |
| 9,481,998 | B2 | 11/2016 | Pilz et al. |
| 9,512,614 | B2 | 12/2016 | Klein et al. |
| 9,523,193 | B2 * | 12/2016 | Pilz ............... E04B 1/944 |
| 9,551,148 | B2 | 1/2017 | Pilz |
| 9,616,259 | B2 | 4/2017 | Pilz et al. |
| 9,637,914 | B2 | 5/2017 | Pilz et al. |
| 9,683,364 | B2 | 6/2017 | Pilz et al. |
| 9,719,253 | B2 | 8/2017 | Stahl, Jr. et al. |
| 9,739,052 | B2 | 8/2017 | Pilz et al. |

(56) References Cited

U.S. PATENT DOCUMENTS

| | | |
|---|---|---|
| 9,739,054 B2 | 8/2017 | Pilz et al. |
| 9,752,318 B2 | 9/2017 | Pilz |
| 9,879,421 B2 | 1/2018 | Pilz |
| 9,909,298 B2 | 3/2018 | Pilz |
| 9,931,527 B2 | 4/2018 | Pilz et al. |
| 9,995,039 B2 | 6/2018 | Pilz et al. |
| 10,000,923 B2 | 6/2018 | Pilz |
| 10,011,983 B2 | 7/2018 | Pilz et al. |
| 10,077,550 B2 | 9/2018 | Pilz |
| 10,184,246 B2 | 1/2019 | Pilz et al. |
| 10,214,901 B2 | 2/2019 | Pilz et al. |
| 10,227,775 B2 | 3/2019 | Pilz et al. |
| 10,246,871 B2 | 4/2019 | Pilz |
| 10,406,389 B2 * | 9/2019 | Pilz .................. E04B 2/7457 |
| 10,494,818 B2 | 12/2019 | Maziarz |
| 10,563,399 B2 | 2/2020 | Pilz et al. |
| 10,619,347 B2 | 4/2020 | Pilz et al. |
| 10,689,842 B2 * | 6/2020 | Pilz .................... E04B 1/948 |
| 10,753,084 B2 | 8/2020 | Pilz et al. |
| 2002/0029535 A1 | 3/2002 | Loper |
| 2002/0160149 A1 | 10/2002 | Garofalo |
| 2002/0170249 A1 | 11/2002 | Yulkowski |
| 2003/0079425 A1 | 5/2003 | Morgan et al. |
| 2003/0089062 A1 | 5/2003 | Morgan et al. |
| 2003/0196401 A1 | 10/2003 | Surowiecki |
| 2003/0213211 A1 | 11/2003 | Morgan et al. |
| 2004/0010998 A1 | 1/2004 | Turco |
| 2004/0016191 A1 | 1/2004 | Whitty |
| 2004/0045234 A1 | 3/2004 | Morgan et al. |
| 2004/0139684 A1 | 7/2004 | Menendez |
| 2004/0211150 A1 | 10/2004 | Bobenhausen |
| 2005/0183361 A1 | 8/2005 | Frezza |
| 2005/0246973 A1 | 11/2005 | Jensen |
| 2006/0032163 A1 | 2/2006 | Korn |
| 2006/0123723 A1 | 6/2006 | Weir et al. |
| 2006/0213138 A1 | 9/2006 | Milani et al. |
| 2007/0056245 A1 | 3/2007 | Edmondson |
| 2007/0068101 A1 | 3/2007 | Weir et al. |
| 2007/0130873 A1 | 6/2007 | Fisher |
| 2007/0175140 A1 | 8/2007 | Giannos |
| 2007/0193202 A1 | 8/2007 | Rice |
| 2007/0261343 A1 | 11/2007 | Stahl, Sr. |
| 2008/0087366 A1 | 4/2008 | Yu et al. |
| 2008/0134589 A1 | 6/2008 | Abrams et al. |
| 2008/0172967 A1 | 7/2008 | Hilburn |
| 2008/0196337 A1 | 8/2008 | Surowiecki |
| 2008/0250738 A1 | 10/2008 | Howchin |
| 2009/0090074 A1 | 4/2009 | Klein |
| 2009/0223159 A1 | 9/2009 | Colon |
| 2010/0170172 A1 * | 7/2010 | Klein .................. E04B 2/7411 52/232 |
| 2010/0199583 A1 | 8/2010 | Behrens et al. |
| 2011/0011019 A1 | 1/2011 | Stahl, Jr. et al. |
| 2011/0041415 A1 | 2/2011 | Esposito |
| 2011/0056163 A1 | 3/2011 | Kure |
| 2011/0067328 A1 | 3/2011 | Naccarato et al. |
| 2011/0099928 A1 | 5/2011 | Klein et al. |
| 2011/0146180 A1 | 6/2011 | Klein |
| 2011/0167742 A1 | 7/2011 | Klein |
| 2011/0185656 A1 | 8/2011 | Klein |
| 2011/0214371 A1 | 9/2011 | Klein |
| 2012/0023846 A1 | 2/2012 | Mattox et al. |
| 2012/0180414 A1 | 7/2012 | Burgess |
| 2012/0247038 A1 | 10/2012 | Black |
| 2012/0266550 A1 | 10/2012 | Naccarato et al. |
| 2012/0297710 A1 | 11/2012 | Klein |
| 2013/0031856 A1 * | 2/2013 | Pilz .................. E04B 2/7457 52/232 |
| 2013/0118102 A1 * | 5/2013 | Pilz .................... E04B 1/948 52/232 |
| 2013/0205694 A1 | 8/2013 | Stahl, Jr. |
| 2014/0219719 A1 | 8/2014 | Hensley et al. |
| 2015/0135631 A1 | 5/2015 | Foerg |
| 2015/0275506 A1 | 10/2015 | Klein et al. |
| 2015/0275507 A1 * | 10/2015 | Klein .................. E04B 2/7411 277/628 |
| 2015/0275510 A1 | 10/2015 | Klein et al. |
| 2016/0017598 A1 | 1/2016 | Klein et al. |
| 2016/0017599 A1 | 1/2016 | Klein et al. |
| 2016/0097197 A1 * | 4/2016 | Pilz .................. E04B 2/7411 52/232 |
| 2016/0130802 A1 | 5/2016 | Pilz |
| 2016/0208484 A1 | 7/2016 | Pilz |
| 2016/0265219 A1 | 9/2016 | Pilz |
| 2017/0016227 A1 | 1/2017 | Klein |
| 2017/0175386 A1 * | 6/2017 | Pilz .................... E04B 1/948 |
| 2017/0198473 A1 | 7/2017 | Pilz |
| 2017/0234004 A1 | 8/2017 | Pilz |
| 2017/0260741 A1 | 9/2017 | Ackerman |
| 2017/0306615 A1 | 10/2017 | Klein et al. |
| 2017/0328057 A1 | 11/2017 | Pilz |
| 2018/0010333 A1 | 1/2018 | Foerg |
| 2018/0044913 A1 | 2/2018 | Klein et al. |
| 2018/0171624 A1 | 6/2018 | Klein et al. |
| 2018/0195282 A1 | 7/2018 | Pilz |
| 2018/0289994 A1 | 10/2018 | Pilz |
| 2018/0291619 A1 | 10/2018 | Ackerman et al. |
| 2018/0347189 A1 | 12/2018 | Pilz |
| 2018/0363293 A1 | 12/2018 | Pilz |
| 2019/0284797 A1 | 9/2019 | Pilz |
| 2019/0316348 A1 | 10/2019 | Pilz |
| 2019/0316350 A1 | 10/2019 | Pilz |
| 2019/0330842 A1 | 10/2019 | Pilz |
| 2019/0338513 A1 | 11/2019 | Pilz |
| 2019/0344103 A1 | 11/2019 | Pilz et al. |
| 2019/0360195 A1 * | 11/2019 | Pilz .................... E04B 1/948 |
| 2020/0240140 A1 | 7/2020 | Pilz |
| 2020/0284030 A1 | 9/2020 | Pilz |
| 2020/0325679 A1 | 10/2020 | Pilz |
| 2020/0340240 A1 | 10/2020 | Pilz |

FOREIGN PATENT DOCUMENTS

| | | |
|---|---|---|
| CA | 2736834 | 12/2015 |
| CA | 2803439 | 3/2017 |
| CA | 3010414 | 8/2017 |
| CA | 2827183 | 7/2018 |
| CA | 3036429 | 9/2019 |
| CA | 3041494 | 10/2019 |
| CA | 3058865 | 7/2020 |
| EP | 0 346 126 | 12/1989 |
| GB | 2 159 051 | 11/1985 |
| GB | 2 411 212 | 8/2005 |
| GB | 2 424 658 | 10/2006 |
| JP | 06-146433 | 5/1994 |
| JP | 06-220934 | 8/1994 |
| WO | WO 2003/038206 | 5/2003 |
| WO | WO 2007/103331 | 9/2007 |
| WO | WO 2009/026464 | 2/2009 |
| WO | WO 2017/129398 | 8/2017 |

OTHER PUBLICATIONS

U.S. Appl. No. 15/943,349, filed Apr. 2, 2018, Pilz et al.
U.S. Appl. No. 15/986,280, filed May 22, 2018, Pilz et al.
U.S. Appl. No. 16/001,228, filed Jun. 6, 2018, Pilz et al.
U.S. Appl. No. 16/112,118, filed Aug. 24, 2018, Pilz.
U.S. Appl. No. 16/598,211, filed Oct. 10, 2019, Pilz.
U.S. Appl. No. 16/791,869, filed Feb. 14, 2020, Pilz et al.
U.S. Appl. No. 16/809,401, filed Mar. 4, 2020, Pilz.
U.S. Appl. No. 16/845,535, filed Apr. 10, 2020, Pilz et al.
BlazeFrame 2009 catalog of products, available at least as of Mar. 4, 2010 from www.blazeframe.com, in 20 pages.
Canadian First Office Action for Application No. 2,697,295, dated Sep. 21, 2011, in 4 pages.
Canadian Second Office Action for Application No. 2,697,295, dated May 23, 2012, in 4 pages.
Canadian Office Action for Application No. 2,827,183, dated Mar. 27, 2015 in 4 pages.
Canadian Office Action for Application No. 2,827,183, dated Mar. 7, 2016 in 4 pages.

(56) References Cited

OTHER PUBLICATIONS

Canadian Office Action for Applicaton No. 2,802,579, dated Jan. 3, 2019 in 3 pages.
Catalog page from Stockton Products, printed from www.stocktonproducts.com, on Dec. 16, 2007, showing #5 Drip, in 1 page.
ClarkDietrich Building Systems, Product Submittal Sheet, (FTSC) Flat Trail Vertical Slide Clip. CD-FTSC11 Jul. 2011. 1 page.
DoubleTrackTM information sheets by Dietrich Metal Framing, in 2 pages; accessible on Internet Wayback Machine on Jul. 8, 2006.
FireStikTM by CEMCO Brochure, published on www.firestik.us, in 18 pages; accessible on Internet Wayback Machine on Aug. 13, 2007.
Information Disclosure Statement letter; U.S. Appl. No. 12/196,115, dated Aug. 4, 2011.
International Search Report for Application No. PCT/US2008/073920, dated Apr. 9, 2009.
"Intumescent Expansion Joint Seals", Astroflame; http://www.astroflame.com/intumescent_expansion_joint_seals; Jul. 2011; 4 pages.
James A. Klein's Answer, Affirmative Defenses and Counterclaims to Third Amended Complaint; U.S. District Court, Central District of California; Case No. 2:12-cv-10791-DDP-MRWx; Filed Sep. 17, 2014; pp. 1-37.
Letter from Thomas E. Loop; counsel for defendant; Jun. 26, 2015.
Expert Report of James William Jones and exhibits; Case No. CV12-10791 DDP (MRWx); May 18, 2015.
Letter from Ann G. Schoen of Frost Brown Todd, LLC; Jun. 24, 2015.
"System No. HW-D-0607", May 6, 2010, Metacaulk, www.rectorseal.com, www.metacault.com; 2008 Underwriters Laboratories Inc.; 2 pages.
Trim-Tex, Inc., TRIM-TEX Wall Mounted Deflection Bead Installation Instructions, 2 pages. [Undated. Applicant requests that the Examiner review and consider the reference as prior art for the purpose of examination.].
"Wall Mounted Deflection Bead," Trim-Tex Drywall Products; Oct. 9, 2016; 3 pages.
U.S. Appl. No. 17/001,422, filed Aug. 24, 2020, Pilz et al.

\* cited by examiner

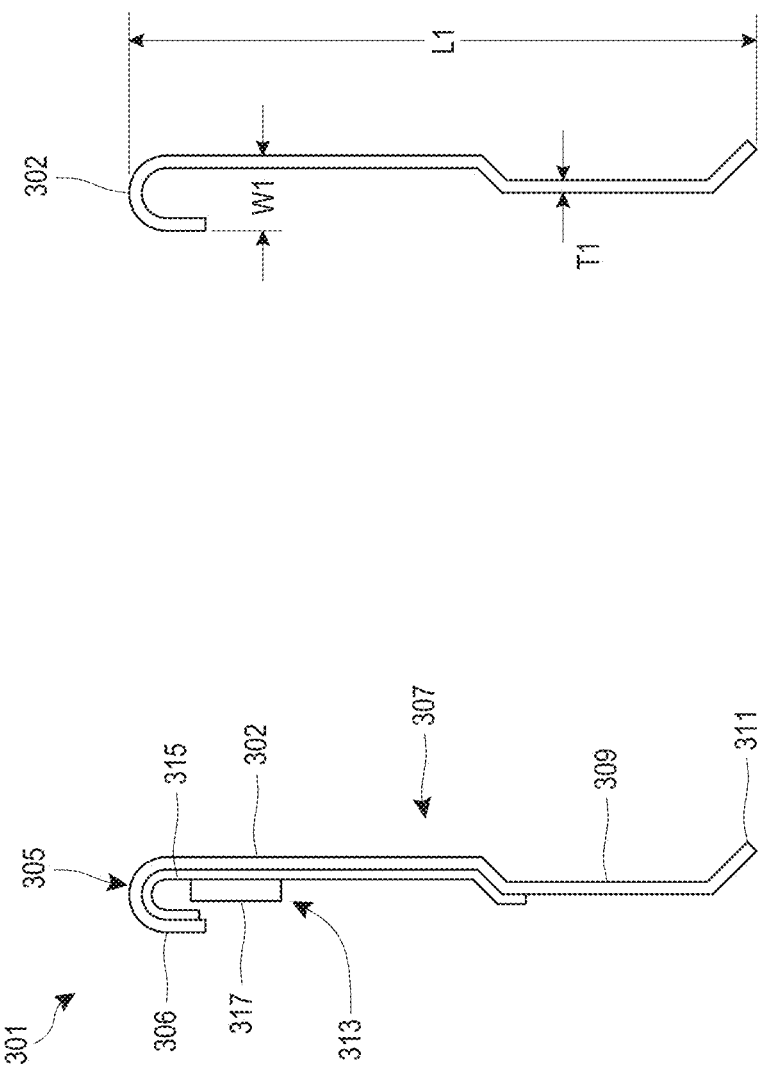

MULTI-LAYER FIRE-RATED JOINT COMPONENT

INCORPORATION BY REFERENCE TO ANY PRIORITY APPLICATIONS

Any and all applications for which a foreign or domestic priority claim is identified in the Application Data Sheet as filed with the present application are hereby incorporated by reference in their entirety.

BACKGROUND

Field

The disclosure generally relates to fire-rated building structures. In particular, the disclosure relates to fire-rated joint systems, wall assemblies, and other building structures that incorporate the fire-rated joint systems.

Description of the Related Art

Fire-rated construction components and assemblies are commonly used in the construction industry. These components and assemblies are aimed at inhibiting or preventing fire, heat, or smoke from leaving one room or other portion of a building and entering another room or portion of a building. The fire, heat or smoke usually moves between rooms through vents, joints in walls, or other openings. The fire-rated components often incorporate fire-retardant materials which substantially block the path of the fire, heat or smoke for at least some period of time. Intumescent materials work well for this purpose, because they swell and char when exposed to flames helping to create a barrier to the fire, heat, and/or smoke.

One particular wall joint with a high potential for allowing fire, heat or smoke to pass from one room to another is the joint between the top of a wall and the ceiling, which can be referred to as a head-of-wall joint. In modern multi-story or multi-level buildings, the head-of-wall joint is often a dynamic joint in which relative movement between the ceiling and the wall is permitted. This relative movement is configured to accommodate deflection in the building due to loading of the ceiling or seismic forces. The conventional method for creating a fire-rated head-of-wall joint is to stuff a fire-resistant mineral wool material into the head-of-wall joint and then spray an elastomeric material over the joint to retain the mineral wool in place. This conventional construction of a fire-rated head-of-wall joint is time-consuming, expensive and has other disadvantages.

A wall assembly commonly used in the construction industry includes a header track, bottom track, a plurality of wall studs and a plurality of wall board members, possibly among other components. A typical header track resembles a generally U-shaped (or some other similarly shaped) elongated channel capable of receiving or covering the ends of wall studs and holding the wall studs in place. The header track also permits the wall assembly to be coupled to an upper horizontal support structure, such as a ceiling or floor of a higher level floor of a multi-level building.

Header tracks generally have a web and a pair of flanges, which extend in the same direction from opposing edges of the web. The header track can be slotted header track, which includes a plurality of slots spaced along the length of the track and extending in a vertical direction. When the wall studs are placed into the slotted track, each of the plurality of slots aligned with a wall stud accommodates a fastener used to connect the wall stud to the slotted track. The slots allow the wall studs to move generally orthogonally relative to the track, creating a deflection gap between the wallboard and the upper horizontal support structure. In those areas of the world where earthquakes are common, movement of the wall studs is important. If the wall studs are rigidly attached to the slotted track and not allowed to move freely in at least one direction, the stability of the wall and the building might be compromised. With the plurality of slots, the wall studs are free to move. Even in locations in which earthquakes are not common, movement between the studs and the header track can be desirable to accommodate movement of the building structure due to other loads, such as stationary or moving overhead loads.

Recently, improvements to fire-rated head-of-wall joints have been developed. One example is the use a metal profile having a layer of intumescent material in a head-of-wall joint, such as the fire-rated angle manufactured and sold by the Applicant under the trade name Deflection Drift Angle (DDA™). The DDA™ angle is further described in U.S. Pat. No. 8,595,999, the entirety of which is hereby incorporated by reference. The DDA™ angle can be installed along with the installation of the header track or can be installed after the installation of the header track. Such an arrangement avoids the need to have the framers return after the installation of the wall board to install fire sealant in the deflection gap between the edge of the wall board and the overhead structure. When temperatures rise (e.g., due to a fire), the intumescent material on the DDA™ fire block product expands. This expansion creates a barrier which fills the deflection gap and inhibits or at least substantially prevents fire, heat and smoke from moving through the head-of-wall joint and entering an adjacent room for at least some period of time.

SUMMARY

Although the DDA™ fire block represents an improvement over the conventional method of stuffing mineral wool material into the head-of-wall joint and applying the elastomeric spray material over the mineral wool, there still exists room for improved or alternative products, materials and methods for efficiently and cost-effectively creating fire-rated wall joints. The systems, methods and devices described herein have innovative aspects, no single one of which is indispensable or solely responsible for their desirable attributes. Without limiting the scope of the claims, some of the advantageous features will now be summarized.

One aspect of head-of-wall assemblies including a fire-blocking gasket profile according to the present disclosure is sealing of the head-of-wall joint against noise, heat and/or smoke. Noise, smoke, heat, etc. can pass between adjacent room across a head-of-wall assembly. In some head-of-wall assemblies, the noise, smoke or heat can pass through the deflection gap. The more open the deflection gap, the more noise, smoke or heat that can pass and the more closed the joint, the less noise, smoke or heat that can pass. Sealing against noise, smoke or heat passing across a head-of-wall joint can advantageously provide the benefits of sound, smoke or heat isolation and containment. Thus, various embodiments of this disclosure relate to improved sealing across a head-of-wall assembly using an improved fire-blocking gasket profile.

Another aspect of some header block assemblies having a fire-blocking gasket profile in the present disclosure is the use of a vinyl material (or other polymer or plastic material) for a profile of the fire-blocking gasket profile. Vinyl material offers several advantages over known materials in fire-blocking gasket profiles and similar assemblies. For example, vinyl material can be incredibly flexible and can function to aid in the sealing across head-of-wall assembly. The vinyl material can also allow for compressible track profiles that can collapse and expand within a head-of-wall assembly corresponding to the closed and open positions of the deflection gap. Vinyl material can be easily extruded and co-extruded with other materials. The vinyl material can also be produced cheaply and in large quantities and it also ships lighter than other materials (e.g. metals) having similar volumes and dimensions.

Another aspect of some head-of-wall assemblies including a fire-blocking gasket profile according to the present disclosure is the use of an air gap within the track profile. The air gap can be located within the fire-blocking gasket profile and can reduce the transfer of heat to a thermocouple for use in UL testing. This can allow the fire-blocking gasket profile to pass the test by reducing the transfer of heat via the air gap. The air gap can reduce heat transferred to an intumescent material assembled within the air gap. The intumescent material can be positioned within the air gap.

Another aspect of some head-of-wall assemblies having a fire-blocking gasket profile according to the present disclosure is the use of a foil tape or other foil layer lining the vinyl profile. For example, the foil tape can fully or partially line the air gap within the vinyl profile. The intumescent material can be attached to the foil tape and the foil tape can be attached to the vinyl material. The foil tape can provide additional protection for the vinyl material and the intumescent material and/or containment of the intumescent material during expansion of the intumescent material.

Another aspect of some head-of-wall assemblies having a fire-blocking gasket profile according to the present disclosure is a vinyl profile that has an outward facing contoured and/or round profile that can compress flatly against the leg of a header track of the head-of-wall assembly. The vinyl profile can compress flat against the leg of the header track when the deflection gap is in the fully closed position and it can spring back out when the deflection gap is in the open position.

In one embodiment a fire-blocking gasket profile is an elongate, multi-layer fire-rated joint component (e.g., head-of-wall component) comprising three layers. A first layer is a vinyl profile. A second layer is a foil liner. A third layer is a strip of intumescent material. The second layer (foil liner) can be located between the intumescent material and the vinyl profile. The third layer (intumescent strip) can be attached to the second layer or to the first layer on an inner surface of the leg of the vinyl profile.

Another aspect of the fire-blocking gasket profile is the vinyl profile has an outward facing round contoured profile that will compress generally flat against the leg of the track when a deflection gap of the head-of-wall assembly is in a closed position and spring back out when the deflection gap is in an open position. The round contoured profile can aid in sealing across the head-of-wall assembly by engaging with a ceiling structure thereof.

Another aspect of the fire-blocking gasket profile is that the foil liner provides further heat protection to the vinyl and/or intumescent material. This extra heat protection allows the intumescent material to expand and fully seal off the deflection gap even after the vinyl material begins to burn away and before the foil liner burns away. In some configurations, vinyl burns away at approximately 500° F. and foil tape burns away at approximately 1200° F.

Another aspect of the fire-blocking gasket profile is an air gap within the vinyl profile. The air gap can contain or partially contain the intumescent material. The foil liner can at least partially line the air gap. The air gap can slow the transfer of heat across the fire-blocking gasket profile to allow passage of UL testing and/or to delay or slow the expansion of the intumescent material.

BRIEF DESCRIPTION OF THE DRAWINGS

Various embodiments are depicted in the accompanying drawings for illustrative purposes, and should in no way be interpreted as limiting the scope of the embodiments. Various features of different disclosed embodiments can be combined to form additional embodiments, which are part of this disclosure.

FIG. 9 shows a fire-blocking gasket profile according to a third embodiment.

FIG. 10 shows a profile of the fire-blocking gasket profile of FIG. 9.

DETAILED DESCRIPTION

The various features and advantages of the systems, devices, and methods of the technology described herein will become more fully apparent from the following description of the embodiments illustrated in the figures. These embodiments are intended to illustrate the principles of this disclosure, and this disclosure should not be limited to merely the illustrated examples. The features of the illustrated embodiments can be modified, combined, removed, and/or substituted as will be apparent to those of ordinary skill in the art upon consideration of the principles disclosed herein.

The following disclosure provides an elongate, multi-layer fire-rated joint component or fire-blocking gasket profile or profile, which is configured to provide fire protection and pass the relevant UL fire rating test. The multi-layer fire-rated joint component may be installed in a deflection gap of a wall assembly that allows dynamic movement according to the requirements of UL-2079.

Figure 1:
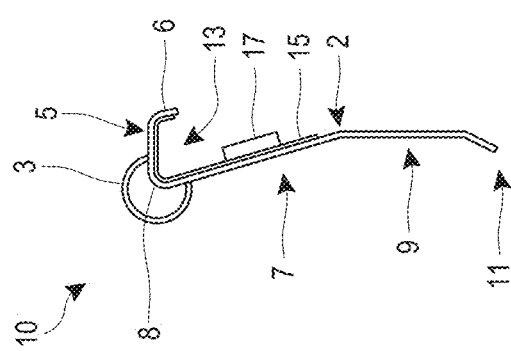
FIG. 1 illustrates a fire-blocking component in the form of a strip according to a first embodiment.

FIG. 1 illustrates a fire-blocking component, which can be an elongate strip or gasket profile 10. The fire-blocking gasket profile 10 can be assembled along an upper edge of a wall within a head-of-wall assembly as illustrated further in FIG. 3. The gasket profile 10 can be used to seal across a dynamic head-of-wall assembly and thereby prevent passage of smoke, heat, noise and/or other gasses from passing through the head-of-wall assembly from one side of the wall to the other. In certain implementations, the gasket profile 10 can be formed in various lengths (e.g., 5', 10', 12' or other) each preferably having the same cross section throughout.

In some configurations, the gasket profile 10 includes three layers. The first layer, profile layer 2, can be or include a vinyl material having a non-linear profile or cross-sectional shape. In the illustrated arrangement, the profile layer 2 is a base layer of the component and defines the basic cross-sectional shape or profile of the gasket profile 10. Accordingly, the profile layer 2 can be referred to herein as a profile layer 2. However, because profile layer 2 defines the basic structure of the component in the illustrated arrangement, the term "profile" can also be used to refer to the entire component or gasket profile 10 as will be made clear by the context of use. Unlike a steel profile or a profile constructed of another metal material, the illustrated profile layer 2 can be very flexible. In some embodiments, the profile layer 2 may be formed from other non-metal materials such as plastic, polyvinyl chloride (PVC), polyethylene or any other suitable plastic. The profile layer 2 can provide structure to the gasket profile 10. The second layer 15 preferably is constructed of a material or materials having a higher melting temperature than the profile layer 2. In some configurations, the second layer 15 can be or include a thin metal material, such as a foil lining 15. The third layer 17 can be or include a fire-blocking or fire-resistant material, such as an intumescent material strip 17. The second layer 15 and the third layer 17 can attach to the first layer or profile layer 2. With such an arrangement, the foil lining 15 can provide benefits of a metal layer, but using a much smaller amount of metal, or by using a material with metal-like properties, so that the overall weight and cost of the gasket profile 10 is lower and the flexibility is greater in comparison to a metal track.

The profile layer 2 can include a leg portion 7 configured in use to extend along a leg or flange of a header track. From a cross-sectional or profile view, the leg portion 7 can be formed of a single straight segment, several straight segments and/or curved segments or a combination thereof. The leg portion 7 need not be straight throughout. The leg portion 7 can include a fastener location 9. The fastener location 9 can be or include a straight segment. In some implementations, the straight segment of the fastener location 9 can be pre-punched or pre-perforated such that a fastener (e.g., a mechanical fastener such as a screw, nail, staple or other) can pass through the leg portion 7. The fastener location 9 can be configured to receive an adhesive (e.g., can include a roughed or contoured surface).

The leg portion 7 can include a lower flange 11. The lower flange 11 can be located below, and can be proximate to, the fastener location 9. The lower flange 11 can form an angle with the straight segment of the fastener location 9. Accordingly, the bottom edge of the gasket profile 10 can be spaced away from the corresponding leg of the header track so that a stud fastener can move from below to behind the gasket profile 10 without damaging, or with reduced damage, to the gasket profile 10. The angle of the lower flange 11 also can be configured to provide rigidity to the gasket profile 10.

An upper end of the leg portion 7 can be coupled with a second leg portion 5, which is referred to herein as a horizontal portion 5. The horizontal portion 5 can couple with the leg portion 7 at a corner 8. The horizontal portion 5 can be generally horizontal or otherwise extend away from the generally vertically-oriented leg portion 7. In an alternative arrangement, the second leg portion 5 extends in a somewhat downward direction towards the leg portion 7, such as at an angle of between about 30-60 degrees, or about 45 degrees from horizontal in the orientation of FIGS. 1 and 2. The horizontal portion 5 can comprise one or more straight and/or curved components or any combination thereof. The horizontal portion 5 can support an upper flange 6 on an edge opposite the leg portion 7. The upper flange 6 can be a straight and/or curved portion that couples with the horizontal portion 5 and preferably extends downwardly therefrom (or in the same general direction as the leg portion 7). The upper flange 6 can be configured to engage a surface of a corresponding header track to facilitate folding movement of the horizontal portion 5, as is described further below. The horizontal portion 5 alone or in combination with the upper flange 6 can be referred to herein as a spring leg or spring flange. In some implementations the upper flange 6 is parallel to and/or aligns with the straight segment of the fastener location 9 (e.g., in an expanded configuration of the gasket profile 10).

The profile layer 2 can form an air gap 13 by itself or along with a cooperating structure, such as a header track. For example, any one or more of the leg portion 7, the horizontal portion 5 and the upper flange 6 can form the air gap 13. The air gap 13 can be a partially or fully enclosed space defined by the profile layer 2. The air gap 13 can be at least partially collapsible. For example, the horizontal portion 5 can be foldable or bendable with respect to the vertical portion 7 (e.g., at the corner 8 or along the lengths of the horizontal portion 5 or leg portion 7). The partial collapse of the air gap 13 can allow the gasket profile 10 to be compressed into a flat, relatively flat or generally flattened state. The material of the profile layer 2 can be elastic such that the compression and collapse of the air gap 13 is repeatable and the gasket profile 10 can return to its undeflected or natural shape when the flattening force is removed.

The profile layer 2 can include an optional sealing portion or member, which in the illustrated arrangement is in the form of a bubble gasket 3. The bubble gasket 3 can be coupled to or a segment of the profile layer 2 that is extended from the leg portion 7 and/or the horizontal portion 5. In one example, the bubble gasket 3 can be connected to the leg portion 7 at a first end and coupled to the horizontal portion 5 at a second end (from a cross-sectional or end view perspective), as illustrated in FIG. 1. The bubble gasket 3 can comprise a flexible material. In some implementations, this flexible material of the bubble gasket 3 can be the same material as the profile layer 2 and formed as a single or unitary structure with the profile layer 2. In other implementations, the flexible material of the bubble gasket 3 can be a different material than the material of the profile layer 2. For example, the bubble gasket 3 can be formed of a rubber, elastomeric polymer or other plastic material. The material of the bubble gasket 3 can be co-extruded and/or otherwise adhered or mechanically affixed (e.g., within one or more slots) to the profile layer 2. The flexible material preferably is selected such that the bubble gasket 3 can conform to the shape of a surface so that it contacts and return to its undeflected shape when not engaged. In some configurations, a wall thickness of the bubble gasket 3 is smaller than a wall thickness of a portion or an entirety of the profile layer 2. The bubble gasket 3 can be used for sealing of irregularities in a deflection gap in the head-of-wall assembly, as described further below. In some implementations, the bubble gasket 3 can be hollow.

The gasket profile 10 can include the foil lining 15. The foil lining 15 can cover an entire side of the profile layer 2 or only a portion. The foil lining 15 can be formed of a metallic material. For example the foil lining 15 can be formed of a thin sheet of aluminum or other metal. The foil lining 15 can be attached to the profile layer 2. In some implementations, the foil lining 15 can be coupled across portions of the leg portion 7, the horizontal portion 5, and/or the upper flange 6. In one implementation, the foil lining 15 fully or partially surrounds the air gap 13. Optionally, the foil lining 15 can extend onto the upper flange 6. In other implementations, the foil lining can extend all the way across the horizontal portion 5 and/or the vertical portion 7. If desired, the foil lining 15 could be located on a portion or an entirety of either or both sides of the profile layer 2.

The foil lining 15 can be adhered to the profile layer 2. An adhesive (e.g., a commercially available adhesive) can be used to attach the foil lining to the profile layer 2. For example, the foil lining 15 can be in the form of a tape with a foil lining having adhesive applied on one side thereof. The adhesive of the tape can be assembled with the profile layer 2. For example, the tape can be adhered along the length of the fire-blocking gasket profile 1. The tape can be thin and flexible so the tape can follow the complex shape of profile layer 2. The tape can be applied along portions or the entire length of gasket profile 10. In other arrangements, the foil line 15 can be applied as part of the extrusion process of the profile layer 2.

The foil lining 15 can have a thickness of between 3 mil to 8 mil. In some embodiments, the foil lining 15 may be thinner than 3 mil or thicker than 8 mil. The foil lining 15 can be thinner than, for example, a layer of 22 gauge steel, which may provide fire protection but also increases build up at the head-of-wall assembly. The use of thinner foil reduces the amount of buildup (e.g., bulk) in a head-of-wall assembly. The use of thinner foil also reduces cost and increases flexibility so that the gasket profile 10 can better conform to imperfect (e.g., non-linear or non-flat) surfaces.

In some embodiments, the foil lining 15 may be replaced by a nonmetal fire- or heat-resistant material, film, fabric (e.g., mineral cloth) or the like. Such a material preferably has a melting temperature higher than the melting temperature of the material from which the profile layer 2 is formed.

The fire-blocking in the gasket profile 10 can be or include the intumescent material strip 17. The intumescent material strip 17 can be coupled to the foil lining 15. The intumescent material strip 17 can be a heat expandable material that is used to seal the head-of-wall assembly. The intumescent material strip 17 can be coupled anywhere along the foil lining 15. For example, the intumescent material strip 17 can be attached to the leg portion 7 and/or the horizontal portion 5, or otherwise located within the air gap 13. For example, the intumescent material strip 17 can be included in a location proximate the corner 8 between horizontal portion 5 and leg portion 7 of the profile layer 2. In other implementations, the intumescent material 6 can be attached to the upper flap 6.

The intumescent material strip 17 can be adhered to the foil lining 15. For example the intumescent material strip 17 can be in a form of a tape with a strip of intumescent material having an adhesive on one side thereof. The tape can be adhered along the length of the gasket profile 10.

Figure 2:
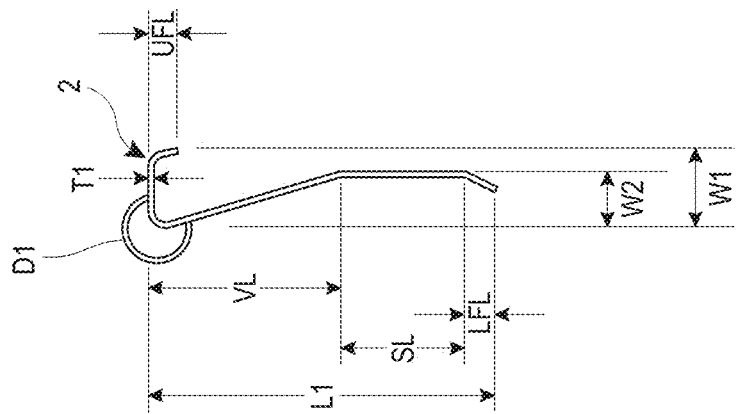
FIG. 2 illustrates a profile of the fire-blocking gasket profile of FIG. 1.

FIG. 2 illustrates exemplary dimensions of the profile layer 2. Certain implementations of the profile layer 2 can vary even greatly from the exemplary dimensions described here. The profile layer 2 can have a width W1. The width W1 can be an overall width of the profile layer 2 without the bubble gasket 3. The width W1 can correspond to the length of the horizontal portion 5. The width W1 can be approximately 0.375". In other implementations, the width W1 can be between 0.125" and 1".

The profile layer 2 can include a width W2. The width W2 can correspond to a width of the leg portion 7 of the profile layer 2. The width W2 can be approximately 0.25". The profile layer 2 can include an overall length L1. The overall length L1 can be an overall length of the leg portion 7 of the profile layer 2. The overall length L1 can be between 1"-3" such as about 1½" or 1 9/16". The air gap 13 can include a vertical length VL. The vertical length VL of the air gap 13 can be approximately 1". A length SL of the straight length of the fastener location 9 can be approximately 0.5". A length LFL of the lower flange 11 can be approximately 0.25". A length UFL of the upper flange 6 can be approximately 0.5".

A thickness T1 of the profile layer 2 can be approximately 0.0625". The thickness T1 selected based on the material properties of the material of the profile layer 2 and its affected elastic properties thereof. The bubble gasket 3 can have a diameter D1. The diameter D1 can be 0.375". In other implementations, the diameter D1 can be between 0.125"-1".

In some implementations, the gasket profile 10 does not include the foil lining 15 and/or the intumescent material 17, as illustrated in FIG. 2. For example, the profile layer 2, with or without the bubble gasket 3, can be used within a head-of-wall assembly, as described below.

Figure 3:
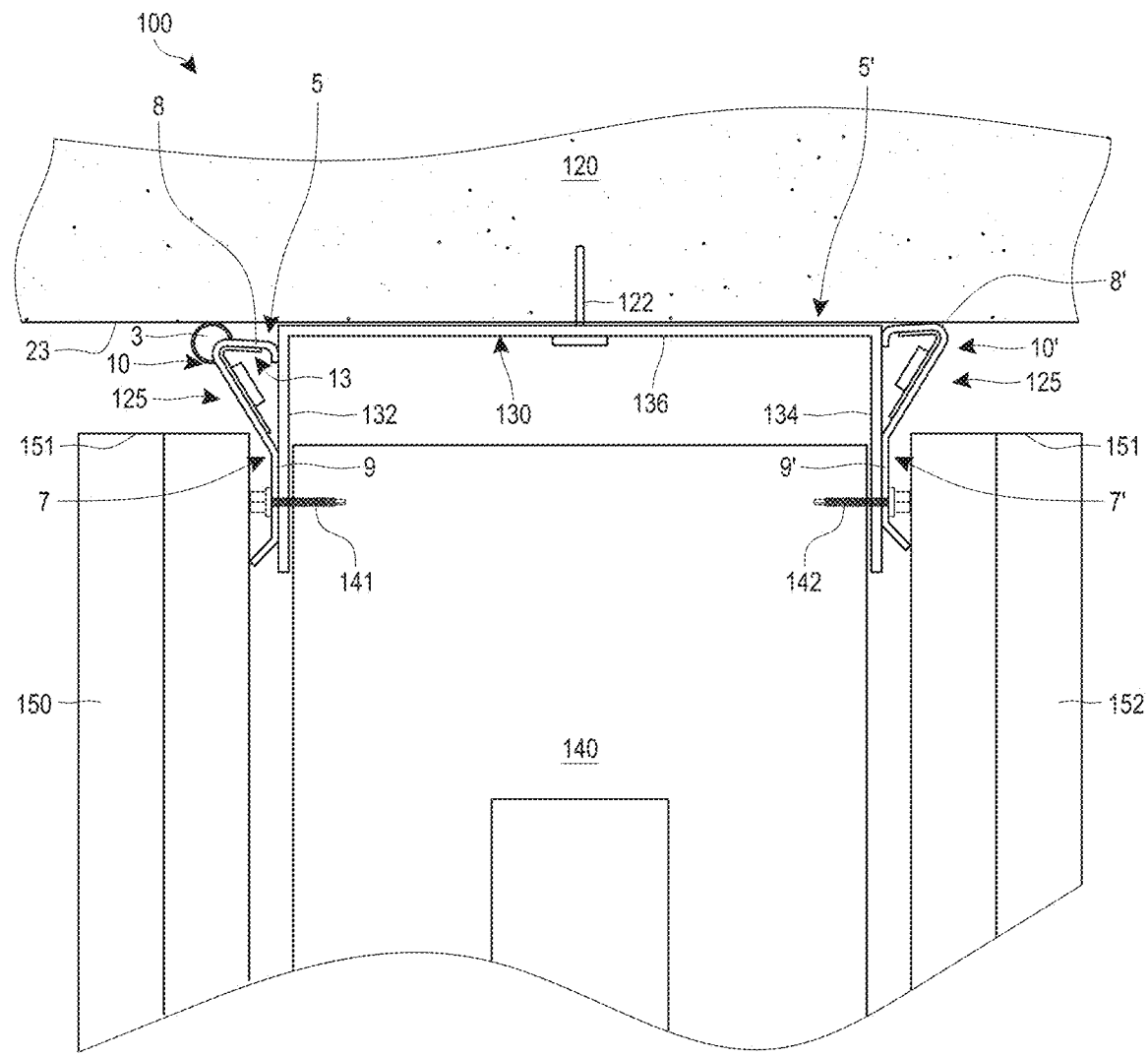
FIG. 3 is a section view of a head-of-wall assembly including the fire-blocking gasket profile of FIG. 1 on a left side and a variation of the fire-blocking gasket profile of FIG. 1 on the right side.

FIG. 3 illustrates the gasket profile 10 installed within a head-of-wall assembly 100. The assembly 100 can include a ceiling 120. The ceiling 120 can be representative of a floor, wall and/or ceiling or other structure. A header track 130 can be coupled with the ceiling 120. For example, a fastener 122 can couple a web portion 136 to the ceiling 120. The header track 130 can include first and second flanges 132, 134. The first and second flanges 132, 134 can extend in parallel from opposite edges of the web 136. An upper end of a stud 140 or a plurality of studs 140 can be disposed within or between the first and second flanges 132, 134. The stud 140 can be coupled with the header track 130 in a manner that allows for a sliding engagement between the header track 130 (e.g., the first and second flanges 132, 134) and the stud 140. For example, the stud 140 can be coupled by a mechanical fastener (e.g., a screw) that passes through a slotted hole within each of the first and/or second flanges 132, 134 and into the stud 140.

A first wallboard 150 (e.g., a gypsum or other board) can be coupled with the stud 140 on a first side of the assembly 100. A second wallboard 152 can be coupled with the stud 140 (or another stud of the plurality of studs) on a second, opposite side of the assembly 100. Optionally, only one wallboard side is in the assembly 100. If desired, multiple wallboard layers can be used on one or both sides of the wall assembly.

The head-of-wall assembly 100 can define a deflection gap 125. The deflection gap 125 can be defined between an upper end 151 of the wallboard 150 (or an upper end 153 of the second wallboard 152) and a lower surface 123 of the ceiling 120. The deflection gap 125 can accommodate dynamic movement of the head-of-wall 100. For example, the stud 140 and wallboards 150, 152 can move in relation to the ceiling 120 and the header track 130. As described above, this can accommodate movement of the ceiling 120 with respect to the stud 140 and wallboards 150, 152 (e.g., due to earthquake or movement of the building).

The fire-blocking gasket profile 10 can be installed within the deflection gap 125. The gasket profile 10 can be provided on one or on both sides of the assembly 100. The leg portion 7 can be coupled with the first flange 132 of the header track 130 (e.g., between the first flange 132 and the wallboard 150). A fastener 141 can couple the fastener location 9 against the first flange 132. The straight segment of the fastener location 9 can be flush against the first flange 132. Preferably, the fastener 141 is positioned between studs 140 of the stud wall so that the studs 140 are permitted to move up and down relative to the header track 130.

In practice, the studs 140 can be installed within the header track 130 and then the fire-blocking gasket profile 10 can be attached to the header track 130. Subsequently, the wallboard 150 can be installed with the upper end 151 at least partially overlapping the leg portion 7 of the gasket profile 10. The lower flange 11 can be flared outwards (e.g., towards the wallboard 150). In some implementations, the lower flange extents outward farther than the fastener 141. The lower flange 11 can sealingly engage with the wallboard 150. The wallboard 150 can elastically deflect the lower flange 11 such that the lower flange 11 exerts a sealing force against the wallboard 150. This sealing engagement can seal against the passage of smoke and/or noise across the head-of-wall assembly 100. The lower flange 11 can also be referred to herein as a "kick-out."

Portions of the horizontal portion 5, the upper flap 6 and/or the bubble gasket 3 can fit adjacent to or within the deflection gap 125. The gasket profile 10 can thereby provide a seal against noise and/or sound across the deflection gap 125. For example, the bubble gasket 3 can sealingly engage with the upper surface 123. The flexible material of the bubble gasket 3 provides the advantages of conforming to and sealing against the upper surface 123 even where the upper surface is uneven and/or irregular. The gasket profile 10 can include a protruding contoured portion that extends into the deflection gap 125. The contoured portion can include the bubble gasket 3, corner 8, and/or horizontal and leg portions 5, 7. In some configurations, a sound-blocking gasket profile 10 is provided that omits the intumescent material strip 17 and/or the foil lining 15. Such an arrangement can be manufactured for a lower cost than a version incorporating fire-blocking material and is well-suited for use to reduce sound transmission through the head-of-wall gap when fire-rating is not required or when another means for fire-rating is used.

FIG. 3 also illustrates a variation of the gasket profile 10. A second gasket profile 10' is shown installed on the right side of the assembly 100 within the deflection gap 125 (e.g., between the upper end 153 of the second wallboard 152 and the upper surface 123). The gasket profile 10' can include the same structure as the gasket profile 10 (e.g., a horizontal portion 5', a leg portion 7', etc.), except the gasket profile 10' does not include a bubble gasket 3. A horizontal portion 5' and/or a corner 8' can sealingly engage with the upper surface 123.

The gasket profile 10 can be assembled within the head-of-wall assembly 100 with an opening of the air gap 13 facing towards the header track 130. The air gap 13 may be formed by the contoured portion or protrusion along an upper portion of the profile layer 2. The protrusion extends in a direction away from the header track 130. The air gap 13 provides clearance in the assembly 100 that allows a thermocouple (TC) used in UL testing to be placed further away from the leg of the header track 130. The increased distance away from the header track 130 can reduce the overall surface temperature measured by the TC. Thus, the air gap provides a buffer to reduce surface temperature of the profile layer 2 and by lowering the surface temperature it allows the profile to pass the UL test that requires the TC to be placed against a surface within the deflection gap 125.

The orientation of the air gap 13 towards header track 130 also provides the advantage of shielding and protecting the intumescent material strip 17 within the air gap 13 from an exterior of the head-of-wall assembly 100. The air gap 13 offsets the intumescent strip from the header track 130. By offsetting the intumescent material strip 17 out of direct contact from the header track 130 and/or locating it within the air gap 13, the temperature of the intumescent strip can rise more slowly. Thus, the intumescent material strip 17 can expand later or at a slower rate than it otherwise would in contact with the header track 130. Also, the intumescent material strip 17 can be protected from contact with the moving wallboard 150, 152 during cycling of the head-of-wall assembly 100.

In contrast, a track with a vinyl profile having intumescent material attached in direct contact with a header track may have difficulty passing UL-2079 testing. This can be because of the lack of an air gap or other insulation gap. Furthermore, when the intumescent material expands on the cold side of the wall (i.e., the side of the wall opposite to where the fire is located), the vinyl of the profile may melt, give way and allow the intumescent material to expand outwardly through the vinyl, causing the thermocouple (TC) which is now in contact with the intumescent to record the high temperature of the expanding intumescent. In other words, the vinyl profile melts away and exposes the intumescent material. The outwardly expanding and less dense exposed intumescent on the cold side will allow too much heat exposure and will exceed the threshold temperature measured by the TC and cause the UL test to fail. As a result, in some circumstances, the vinyl DDA without foil may fail from the elevated temperature of the expanding intumescent. Furthermore, it is possible that the outwardly-expanding intumescent material could fall out of the deflection gap 12, which could also result in a failure.

FIG. 3 illustrates the head-of-wall assembly 100 in an open position of the deflection gap 125. In the open position, the upper flange 6 can slidingly engage with the header track 130. The engagement of the upper flange 6 can position the horizontal portion 5 and/or other portions of the profile layer 2 into the deflection gap 125. This can create the air gap 13 and/or offset the intumescent strip 15 from the header track 130.

Figure 4:
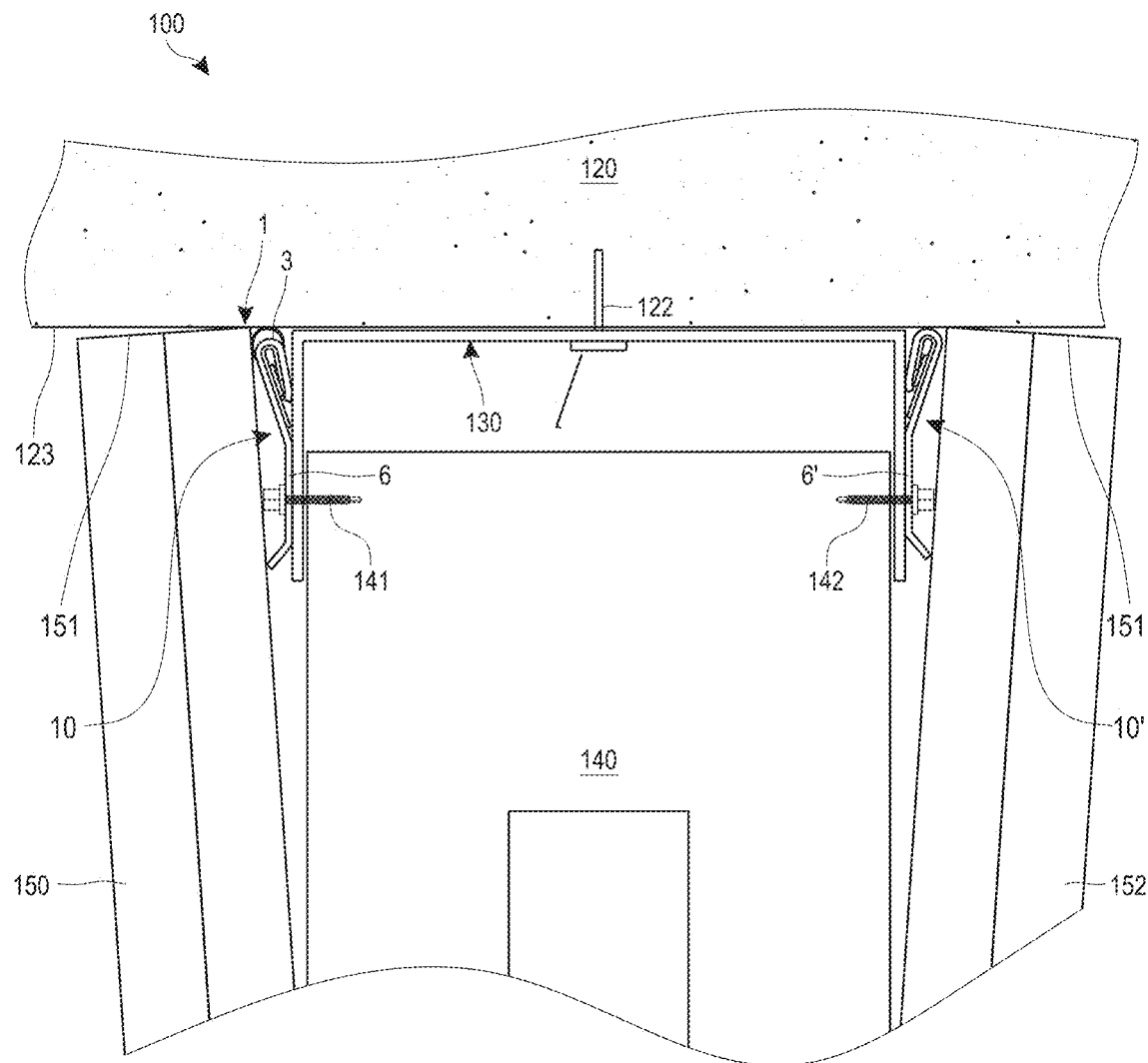
FIG. 4 illustrates the head-of-wall assembly of FIG. 3 in a closed position with the deflection gap reduced compared to FIG. 3 or completely closed.

FIG. 4 illustrates the head-of-wall assembly 100 in a closed position with the deflection gap 125 closed. In the closed position, the gasket profile 10 is compressed into a flat or relatively flat configuration in comparison to its relaxed position with no flattening forces present. The assembly 100 can cycle between the open and closed positions and the gasket profile 10 can correspondingly expand toward or to the relaxed position and compress toward or to the flat configuration. The gasket profile 10 can seal across the assembly 100 in both the open and closed positions. For example, the bubble gasket 3 can remain sealingly engaged with the upper surface 123 in both the expanded and flat configurations. Similarly, the profile layer 2' of gasket profile 10' can be sealingly engaged in both expanded and flat configurations. Advantageously, the expanding of the gasket profile 10, 10' when the deflection gap 125, 125' opens reestablishes or enlarges the size of the air gap 13, 13'.

The material of the profile layer 2 can provide an elastic reaction to expand the gasket profile 10 into an expanded configuration, as shown in FIG. 3. In the flat configuration, the horizontal portion 5 and the upper flange 6 can fold with respect to the leg portion 7 to collapse the air gap 13. To transition into the flat configuration, the upper flange 6 can slide downwards along the first flange 132 of the header track 130. This ensures that the gasket profile 10 can fold toward or into the flat configuration and avoid being crushed within the assembly 100. To transition into the expanded configuration, the upper flange can slide upwards along the first flange 132 to expand the air gap 13.

Figure 5:
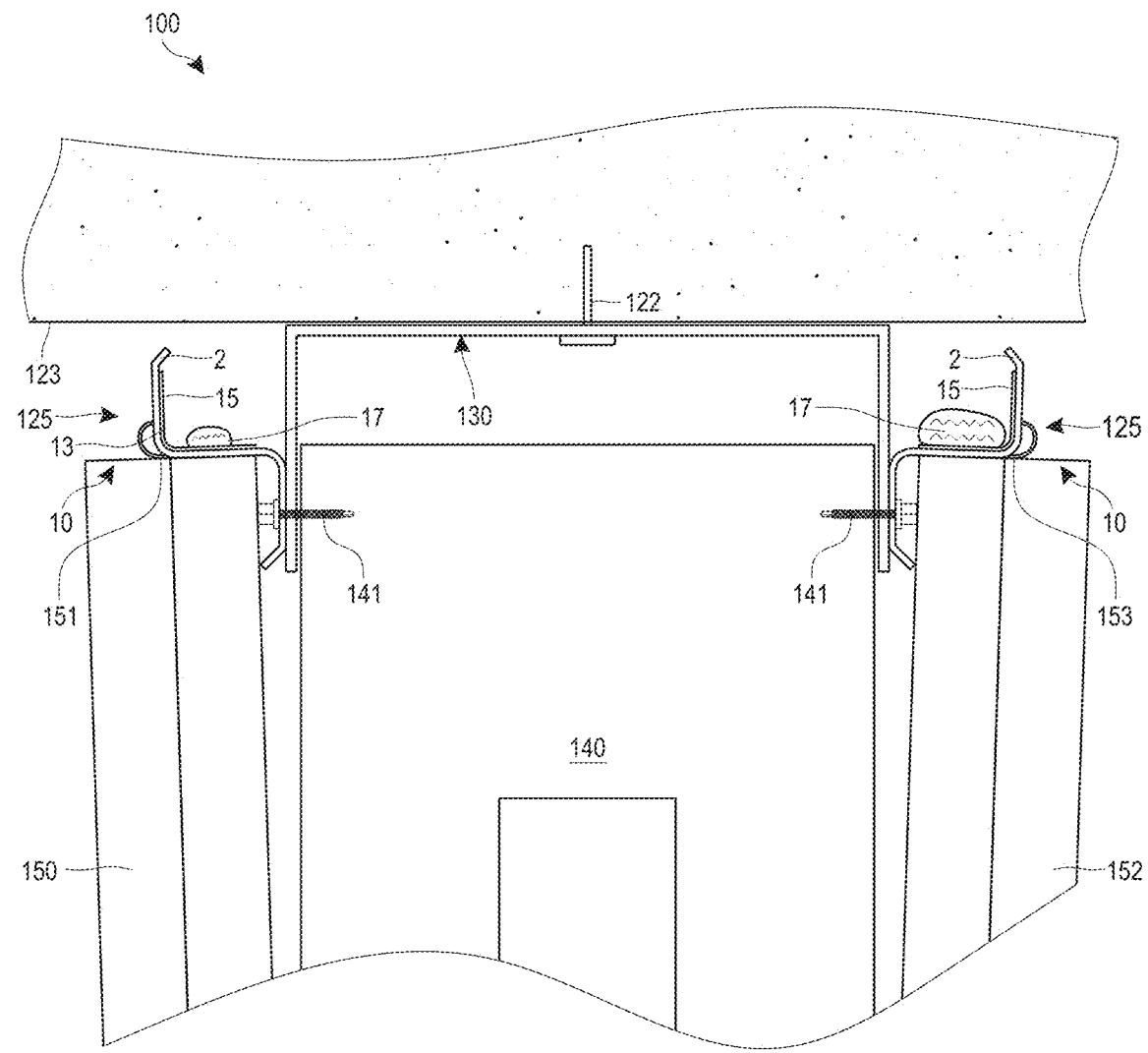
FIG. 5 illustrates the head-of-wall assembly of FIG. 3 showing the collapse of the fire-blocking gasket profiles or tracks on each side to facilitate or provide for primarily vertical (upward) expansion of an intumescent material of the tracks. An initial state of expansion of the intumescent material of the fire-blocking gasket profile on the left side and a further state of expansion on the right side.
Figure 6:
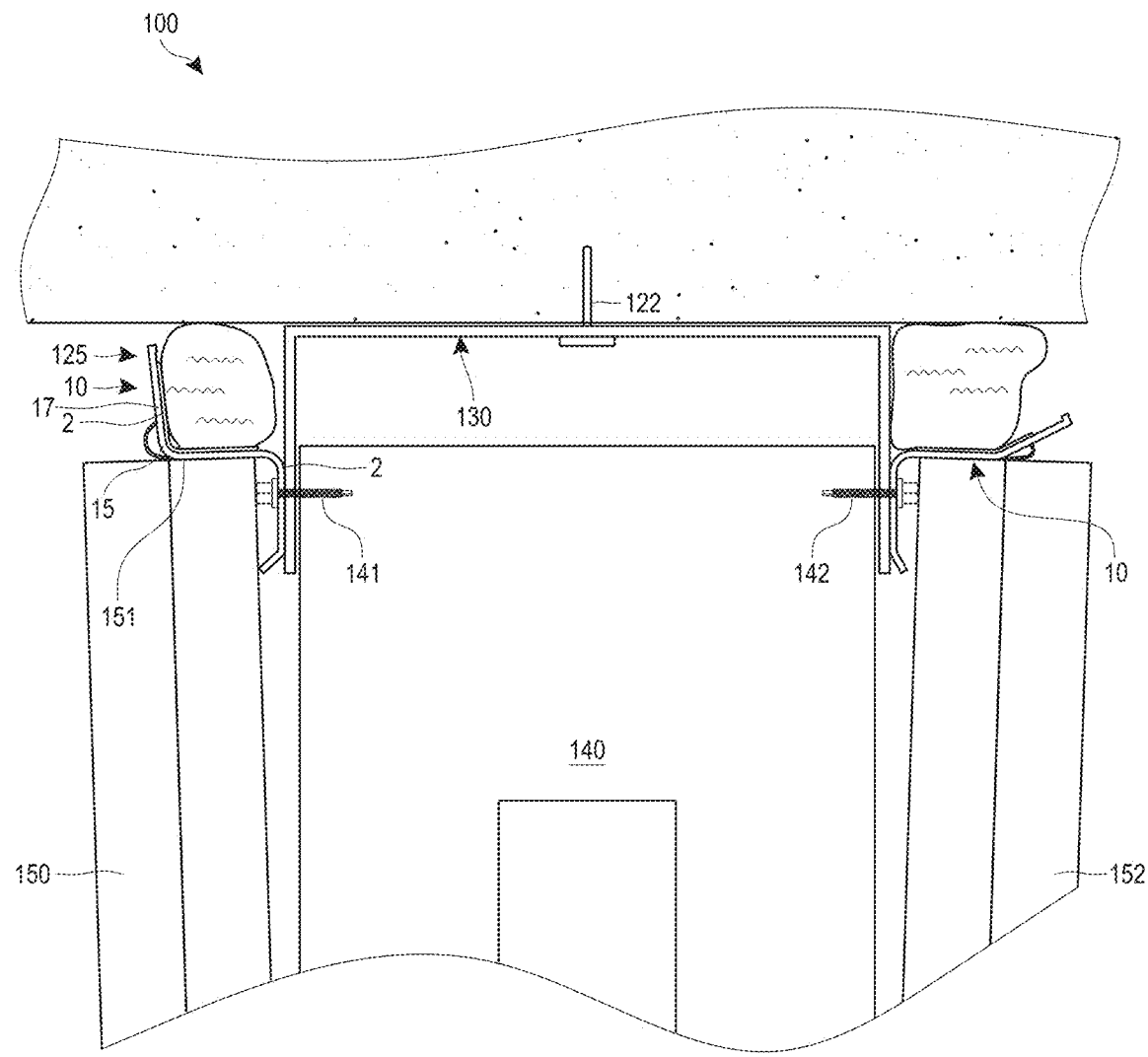
FIG. 6 illustrates the head-of-wall assembly of FIG. 3 showing the intumescent material in progressively further states of expansion from the left side to the right side.

FIGS. 5-6, moving left to right, show the function of the gasket profile 10 when exposed to heat, such as a fire. The gasket profile 10 can be designed such that the material of the profile layer 2 can melt when exposed to heat. For example, the vinyl, plastic, or other material has a low melting point relative to the other materials of the assembly 100 (e.g., gypsum, wood, metal). When melted or at least partially softened, the portions of the profile layer 2 surrounding the air gap 13 of the gasket profile 10 can collapse into the deflection gap 125 and preferably toward the upper ends 151, 153 of the wallboard 150, 152.

Generally, the initiation (e.g., expansion) temperature of the intumescent material strip 17 is approximately 350° F. Vinyl begins to melt and lose form at approximately 350° F. Vinyl eventually dissipates at approximately 500° F. However, foil dissipates at approximately 1200° F. Accordingly, as the temperature within the assembly 100 rises above the melting temperature of the material of the profile layer 2 (e.g., vinyl), the portion of the gasket profile 10 that has the foil lining 15 can stay intact (i.e., not melted or dissipated). That is, the foil lining 15 does not melt immediately to expose the intumescent material strip 17.

The collapse of the gasket profile 10 into the deflection gap 125 offsets the intumescent material from the header 130 and/or other components of the assembly 100. This can slow the heating and therefore the expansion of the intumescent material strip 17. This provides the advantages of a more controlled and/or denser expansion leading to a better seal across the deflection gap 125. The expansion of the intumescent material strip 17 can also be slowed by the air gap 13.

Collapse of the profile layer 2 during a fire can also orient the intumescent material strip 17 to expand vertically upward to seal off the deflection gap 125 instead of outward, as would be the case without collapse of the profile layer 2. The intumescent material strip 17 can be bounded by the ceiling structure 120 and the upper end 151, 153 of the wallboard 150, 152, which causes the expanding intumescent to avoid overexpansion and maintain density as it expands. The density of the intumescent material improves the fire/smoke protection within the deflection gap 125. The expansion process can take up to 20 minutes before the deflection gap 125 is fully sealed.

The foil lining 15 positioned between the profile layer 2 and the intumescent material strip 17 provides integrity to the assembly 100 during a fire. The foil lining 15 acts as an insulating or protective layer for the intumescent material strip 17. Further, the foil lining 15 will maintain structural integrity of the gasket profile 10 such that the position of the intumescent material strip 17 is maintained within the deflection gap 125 and the expanding intumescent material 15 within the deflection gap 125 can be at least partially contained. That is, even if the profile layer 2 loses form and/or melts away, the foil lining 15 will not melt and prevent the expanding intumescent material strip 17 from falling out of the deflection gap 125 and/or expanding in an undesirable direction (e.g., outward, which could permit overexpansion). Accordingly, because the foil lining 15 does not melt, the intumescent material strip 17 is contained and will maintain as a concentrated mass which will maintain the intumescent material strip 17 within the deflection gap 125. However, if there is no containment, the intumescent material 125 could continue to expand and lose its concentrated mass thereby reducing its effectiveness to block heat.

FIG. 5, at left, illustrates the initial collapse of the profile layer 2 into the deflection gap. The intumescent material strip 17 remains attached to the foil lining 15. As the temperature across the assembly 100 increases from the heat, the material of the profile layer 2 will begin to melt and eventually dissipate. However, the foil lining 15 maintains the intumescent material strip 17 within the deflection gap 125 and oriented for vertical expansion.

FIG. 5, at right, illustrates the initial expansion of the intumescent material strip 17. The intumescent material strip 17 is at least partially retained within the deflection gap 125 and is oriented such that the primary direction of expansion is vertically upward. Portions of the profile layer 2 can begin to dissipate from the heat; however, the foil lining 15 remains intact and secures the intumescent material strip 17 in place within the deflection gap 125.

FIG. 6, at left, illustrates the further expansion of the intumescent 17. The material of the profile layer 2 can be further dissipated. The foil lining 15, having a higher melting temperature or dissipation temperature, can at least partially remain after the melting or dissipation of the profile layer 2. FIG. 6, at right, illustrates the final expansion of the intumescent material strip 17. The intumescent material strip 17 fully seals across the deflection gap 125. Undissipated portions of the foil lining 15 and/or the profile layer 2 can remain. The increasing temperatures can also expand the intumescent material strip 17 into an expanded state. In the expanded state, the intumescent material can seal the deflection gap 125 against smoke, heat, fire and other material passing through the head-of-wall assembly 100.

Figure 7:
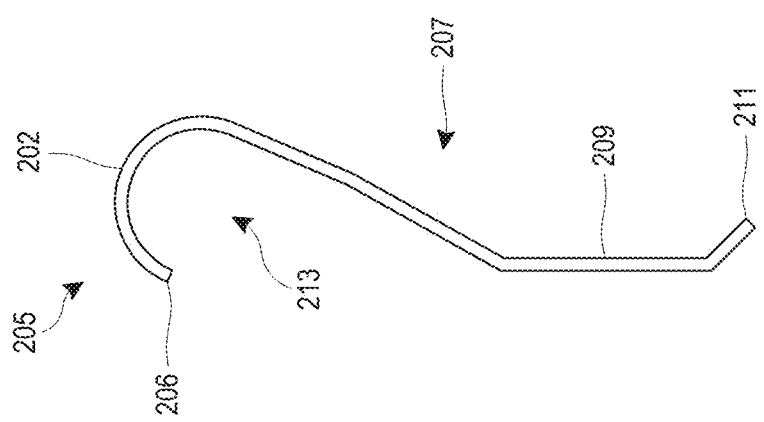
FIG. 7 illustrates a fire-blocking gasket profile according a second embodiment.
Figure 8:
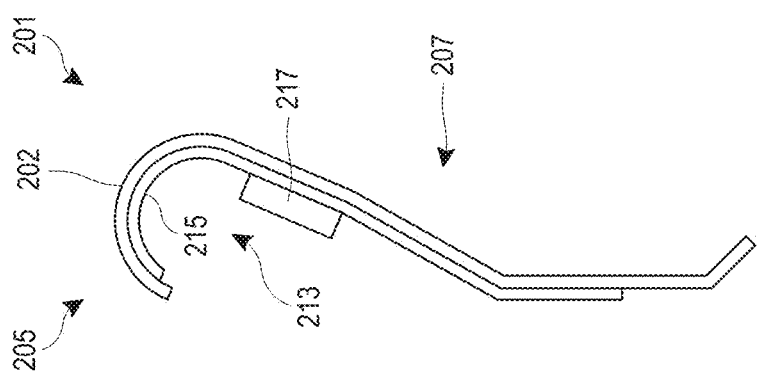
FIG. 8 shows a profile of the fire-blocking gasket profile of FIG. 7.

FIGS. 7-8 illustrate a second embodiment of a fire-blocking component, in the form of a gasket profile 201. In certain implementations, the gasket profile 201 can be formed in various lengths (e.g., 5', 10', 12' or other) each preferably having the same cross section throughout. The gasket profile 201 can be used in the assembly 100, similar to the fire-blocking gasket profile 10. The fire-blocking gasket profile 201 can include a profile layer 202. The profile layer 202 can include a generally horizontal portion 205 and a leg portion 207. The profile layer 202 can include a fastening location 209. The fastening location 209 can be coupled with a lower flange 211.

An air gap 213 can be located between portions of the horizontal portion 205 and the leg portion 207. A foil lining 215 can be coupled to at least portions of the horizontal portion 205 and the leg portion 207. The foil lining 215 can at least partially surround the air gap 213. An intumescent material 217 can be coupled with the foil portion 217. The intumescent material 217 can be located within the air gap 213. The functionality of the gasket profile 201 is substantially similar to the track 1; however, the gasket profile 201 has a more rounded horizontal portion 207 and transition between the horizontal portion 207 and the upper portion of the leg portion 207.

In some implementations, the gasket profile 201 does not include the foil lining 215 and/or the intumescent material 217, as illustrated in FIG. 8. For example, the profile layer 202 can be used within a head-of-wall assembly.

FIG. 9-10 illustrate a third embodiment of a fire-blocking component, in the form of a gasket profile 301. The gasket profile 301 can be used in the assembly 100, similar to the fire-blocking gasket profile 1. In certain implementations, the gasket profile 301 can be formed in various lengths (e.g., 5', 10', 12' or other) each preferably having the same cross section throughout. The fire-blocking gasket profile 301 can include a profile layer 302. The profile layer 302 can include a generally horizontal portion 305. The horizontal portion 305 can be connected to an upper flange 306. A leg portion 307 of the profile layer 302 can extend downwardly from the horizontal portion 305 and can include a fastening location 309. The fastening location 309 can connect to a lower flange 311. An air gap 313 can be defined between at least portions of the horizontal 305 and the leg portion 307 of the profile layer 302.

A foil lining 315 can be disposed on one side of the profile layer 302. The foil lining 315 can at least partially surround the air gap 313. An intumescent material 317 can be attached to the foil lining 315. The intumescent material 317 can be located within the air gap 313. The profile layer 302 can have an overall length L1 between approximately 1.0"-4.0", although this range is not required. The profile layer 302 can have an overall width W1 of between approximately 0.375"-1.125", although this range is not required. The profile layer 302 can have a thickness T1 of between approximately 0.0625"-0.125", although this range is not required.

In some implementations, the gasket profile 301 does not include the foil lining 315 and/or the intumescent material 317, as illustrated in FIG. 10. For example, the profile layer 302 can be used within a head-of-wall assembly.

Figure 11:
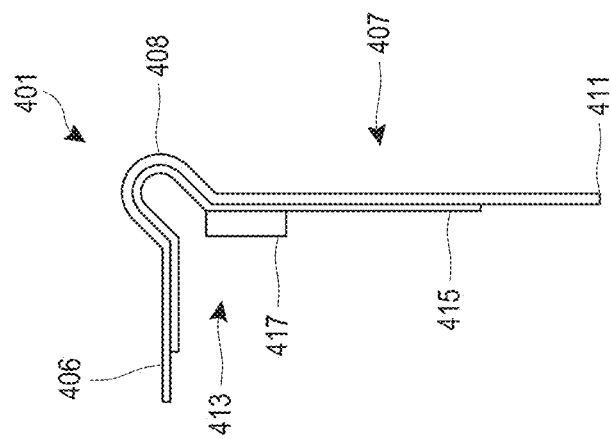
FIG. 11 shows a fire-blocking gasket profile according to a fourth embodiment.

FIG. 11 illustrates another embodiment of a fire-blocking component, in the form of an angle or gasket profile 401. The gasket profile 401 can be used in the assembly 100, similar to the fire-blocking gasket profile 1. In certain implementations, the gasket profile 401 can be formed in various lengths (e.g., 5', 10', 12' or other) each preferably having the same cross section throughout. Fire-blocking gasket profile 401 can include a profile layer 402. The profile layer 402 can include an upper flange 406 and a leg portion 407. The leg portion 407 can be coupled with the upper flange 406 by a bubble 408. The bubble 408 can be of the same material as the profile layer 402 or a different material (e.g., co-extension, adhered, or mechanically fastened together). At the lower end of the 411 of the leg portion 407 can include a fastening location. The upper flange 406 can be configured to be installed within a head-of-wall assembly between a header track 130 and the ceiling 120. For example it can be installed and held in place by friction. The lower portion 411 can be installed between the wall board 150 and the header track 130.

Figure 12:
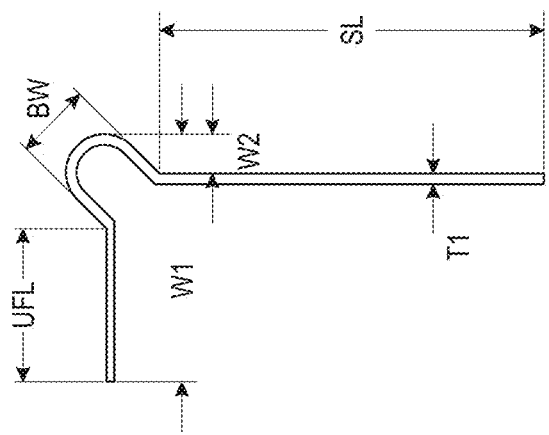
FIG. 12 shows a profile of the fire-blocking gasket profile of FIG. 11.

The gasket profile 401 can include a foil lining 415. The foil lining 415 can extend across portions of the vertical portions 407, the bubble 408, and/or the upper flange 406. An intumescent material 417 can be coupled with the foil lining 415. The bubble 408 can sealingly engage with the ceiling of 120. The upper flange 406 can optionally be slidingly engaged with the header track 130 to bias the track 400 such that a bulged portion (e.g., of the leg portion 407 and the bubble 408, and the horizontal portion 405) extend into the deflection gap 125. In some implementations, the gasket profile 401 does not include the foil lining 415 and/or the intumescent material 417, as illustrated in FIG. 12. For example, the profile layer 402, with or without the bubble 408, can be used within a head-of-wall assembly.

Figure 13:
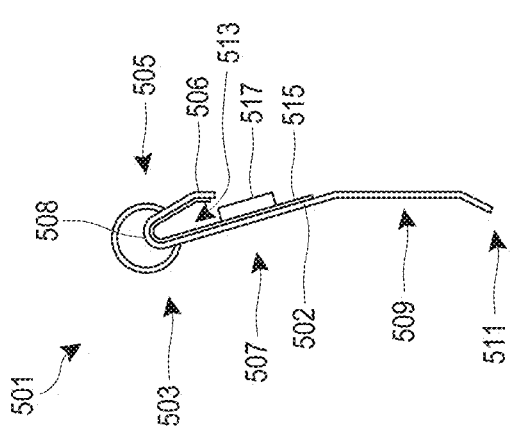
FIG. 13 shows a fire-blocking gasket profile according to a fifth embodiment.

FIG. 13 illustrates another embodiment of a fire-blocking component, in the form of a gasket profile 501. The gasket profile 501 can be used in the assembly 100, similar to the fire-blocking gasket profile 1. In certain implementations, the gasket profile 501 can be formed in various lengths (e.g., 5', 10', 12' or other) each preferably having the same cross section throughout. Fire-blocking gasket profile 501 can include a profile layer 502. The profile layer 502 can include an upper portion 505 and a leg portion 507. An air gap 513 can be at least partially enclosed by the upper portion 505 and the leg portion 507. The upper portion 505 can include a spring flange 506.

The leg portion 507 includes a fastening location 509. In one implementation, the fastening location 509 includes a flat segment. The flat segment can be configured to be pressed in contact with a header track, such as the header track 130 described above. The fastening location 509 can be configured to receive at least one fastener to couple the gasket profile 501 with the header track. In one implementation, the spring flange 506 is parallel to and/or aligns with (e.g., is within the same plane as) the fastening location 509 (e.g., the straight portion thereof). This facilitates assembly of the gasket profile 501 against the header track. Moreover, the spring flange 506 can engage with the header track and act as a spring (e.g., along the horizontal portion 515) to bias the air gap 513 into an open configuration.

The leg portion 507 can be coupled with the upper portion 505 at a corner 508. The gasket profile 501 can include a bubble gasket 503. The bubble gasket 503 can be of the same material as the profile layer 502 or a different material (e.g., co-extension, adhered, or mechanically fastened together with the profile layer 502). The bubble 503 can sealingly engage with a ceiling, such as the ceiling 120.

The leg portion 507 can include a lower flange 511. The lower flange 511 can be flared outward (e.g., towards the left or away from the fastening location 509). The lower flange 511 can be configured to engage with a wallboard (such as the wallboard 150) of a head-of-wall assembly. The lower flange 511 can prevent or diminish the passage of sound or smoke across the head-of-wall assembly by engagement with the wallboard. The lower flange 511 can also be referred to herein as a "kick-out."

Figure 14:
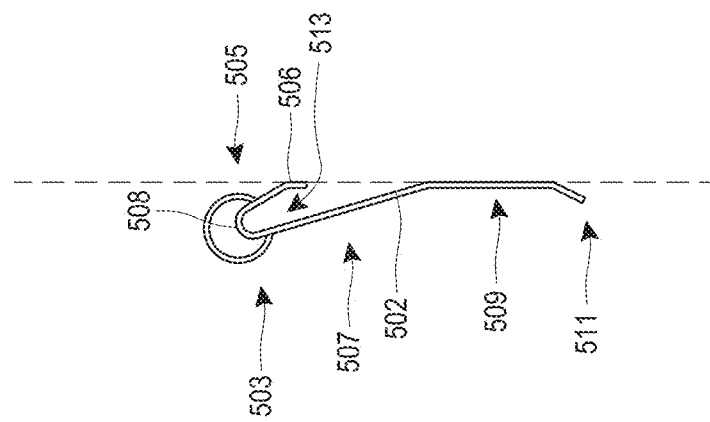
FIG. 14 shows a profile of the fire-blocking gasket profile of FIG. 13.

The gasket profile 501 can include a foil lining 515. The foil lining 515 can be located within the air gap 513. The foil lining 515 can extend across portions of the vertical portion 507 and/or the upper portion 505 (e.g., around the air gap 513). The foil lining 515 can be adhered to the profile layer 502. An intumescent material 517 can be coupled with the gasket profile 501. The intumescent 517 can be coupled with the foil lining 515, within the air gap 513 or otherwise coupled with the profile layer 502. In some implementations, the gasket profile 501 does not include the foil lining 515 and/or the intumescent material 517, as illustrated in FIG. 14. For example, the profile layer 502, with or without the bubble gasket 503, can be used within a head-of-wall assembly.

Certain Terminology

Terms of orientation used herein, such as "top," "bottom," "proximal," "distal," "longitudinal," "lateral," and "end," are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

SUMMARY

Several illustrative embodiments of head-of-wall assemblies and components such as sound-blocking and/or fire-blocking gasket profiles have been disclosed. Although this disclosure has been described in terms of certain illustrative embodiments and uses, other embodiments and other uses, including embodiments and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various embodiments. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one embodiment or example in this disclosure can be combined or used with (or instead of) any other portion of any of the steps, processes, structures, and/or devices disclosed or illustrated in a different embodiment, flowchart, or example. The embodiments and examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems can generally be integrated together in a single product or packaged into multiple products. Additionally, some implementations are within the scope of this disclosure.

Further, while illustrative embodiments have been described, any embodiments having equivalent elements, modifications, omissions, and/or combinations are also within the scope of this disclosure. Moreover, although certain aspects, advantages, and novel features are described herein, not necessarily all such advantages may be achieved in accordance with any particular embodiment. For example, some embodiments within the scope of this disclosure achieve one advantage, or a group of advantages, as taught herein without necessarily achieving other advantages taught or suggested herein. Further, some embodiments may achieve different advantages than those taught or suggested herein.

Some embodiments have been described in connection with the accompanying drawings. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular embodiment of the inventions disclosed herein. No aspects of this disclosure are essential or indispensable. In many embodiments, the devices, systems, and methods may be configured differently than illustrated in the figures or description herein. For example, various functionalities provided by the illustrated modules can be combined, rearranged, added, or deleted. In some embodiments, additional or different processors or modules may perform some or all of the functionalities described with reference to the example embodiment described and illustrated in the figures. Many implementation variations are possible. Any of the features, structures, steps, or processes disclosed in this specification can be included in any embodiment.

In summary, various embodiments and examples of head-of-wall assemblies and fire blocking tracks and related methods have been disclosed. This disclosure extends beyond the specifically disclosed embodiments and examples to other alternative embodiments and/or other uses of the embodiments, as well as to certain modifications and equivalents thereof. Moreover, this disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims.

What is claimed is:

1. A fire-rated head-of-wall assembly, comprising:
    a header track configured to be coupled to a ceiling surface, the header track having a web and first and second flanges extending from the web in a first direction, wherein each of the first and second flanges is substantially planar such that the track defines a substantially U-shaped cross section;
    at least one stud coupled with the header track, an upper end of the stud located between the first and second flanges;
    a wallboard coupled to the stud, an upper end of the wallboard overlapping the first flange of the header track;
    a deflection gap formed between the upper end of the wallboard and ceiling surface, the deflection gap being variable between a closed position and an open position;
    a fire-blocking gasket profile comprising:
        a first layer comprising a vinyl profile, the vinyl profile having a vertical portion and a horizontal portion at least partially defining an air gap, the horizontal portion including an upper flange;
        a second layer comprising a foil lining; and
        a third layer comprising an intumescent material;
    wherein the vertical portion of the vinyl profile is coupled to the first flange of the header track and positioned between the first flange and the wallboard, and the upper flange is positioned at least partially within the deflection gap in the open position and contacts the ceiling surface, and the upper flange slidingly engages with the first flange of the header track, and the horizontal portion including the upper flange is configured to fold towards the vertical portion of the first layer and collapse the air gap as the deflection gap moves towards the closed position;
    wherein the first layer is configured to at least partially melt, the intumescent material is configured to expand to seal the deflection gap, and the foil lining is configured to support the intumescent material within the deflection gap above a first temperature.

2. The assembly of claim 1, wherein the second layer is disposed within the air gap and extends along at least a portion of the horizontal and vertical portions of the first layer, and the third layer is coupled to the second layer and disposed within the air gap.

3. The assembly of claim 1, the first layer further comprising:
    a bubble configured to sealingly engage the ceiling surface.

4. The assembly of claim 3, wherein the bubble is configured to engage the ceiling surface with the deflection gap in the open and closed positions.

5. The assembly of claim 1, wherein a melting temperature of the foil lining is greater than a melting temperature of the vinyl profile and an expansion temperature of the intumescent material is greater than the melting temperature of the vinyl profile.

6. A fire-rated head-of-wall assembly, comprising:
    a header track having a web and first and second flanges extending therefrom;
    at least one stud coupled with the header track;
    a wallboard coupled to the stud, an upper end of the wallboard overlapping the first flange of the header track;
    a deflection gap formed between the upper end of the wallboard and ceiling surface to which the header track is attached, the deflection gap being variable between a closed position and an open position;
    a fire-blocking gasket profile comprising:
        a first layer comprising a profile member including an upper flange, the upper flange slidingly engaged with the header track and at least partially defining an air gap;
        a second layer comprising a foil lining; and
        a third layer comprising an intumescent material;
    wherein the profile member is coupled to the first flange of the header track and the upper flange contacts the ceiling surface to provide a seal across the deflection gap;
    wherein the upper flange is configured to fold towards a vertical portion of the profile member to collapse the air gap as the deflection gap moves towards the closed position.

7. The assembly of claim 6, wherein the first layer is configured to at least partially melt the intumescent material is configured to expand to seal the deflection gap, and the second layer is configured to remain to at least partially support the third layer within the deflection gap above a first temperature.

8. The assembly of claim 6, wherein the second layer at least partially lines the air gap, and the third layer is coupled to the second layer and positioned within the air gap.

9. The assembly of claim 6, the first layer further comprising:
    a bubble configured to sealingly engage the ceiling surface.

10. The assembly of claim 9, wherein the bubble engages the ceiling surface with the deflection gap in the open and closed positions.

11. The assembly of claim 6, wherein a melting temperature of the foil lining is greater than a melting temperature of the profile member.

12. The assembly of claim 6, wherein the profile member comprises a vinyl material.

13. The assembly of claim 6, wherein the profile member comprises a polymer material.

14. The assembly of claim 6, wherein foil lining comprises aluminum.

15. The assembly of claim 6, wherein the profile member comprises a fastener location having a straight segment configured to be assembled flush against the header track.

16. A method of assembling a fire-rated wall joint, comprising:
- securing a header track to a ceiling;
- positioning an upper end of a stud into the header track;
- coupling a vertical portion of a fire-blocking gasket profile to the header track to define an air gap between the fire-blocking gasket profile and the header track, the fire-blocking gasket profile comprising a first layer comprising a vinyl profile, a second layer comprising a foil lining, and a third layer comprising an intumescent material;
- securing a wallboard member to the stud such that a fastening location of the vertical portion of the fire-blocking gasket profile is positioned between the wallboard member and the header track;
- wherein the air gap is at least partially defined by the vertical portion and an upper flange of the fire-blocking gasket profile, the upper flange contacting and being collapsible against the header track during cycling of the wallboard relative to the ceiling.

17. The method of claim 16, further comprising:
- engaging a bubble portion of the fire-blocking gasket profile with the ceiling to seal a deflection gap of the fire-rated wall joint against the passage of smoke and noise.

* * * * *